United States Patent
Urabe et al.

(10) Patent No.: US 12,141,043 B2
(45) Date of Patent: Nov. 12, 2024

(54) UTTERANCE TEST METHOD FOR UTTERANCE DEVICE, UTTERANCE TEST SERVER, UTTERANCE TEST SYSTEM, AND PROGRAM

(71) Applicant: Panasonic Intellectual Property Management Co., Ltd., Osaka (JP)

(72) Inventors: Hiroki Urabe, Osaka (JP); Kentaro Nakai, Tokyo (JP); Satoru Matsunaga, Osaka (JP); Yoshiki Ohashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/765,589

(22) PCT Filed: Jul. 14, 2021

(86) PCT No.: PCT/JP2021/026410
§ 371 (c)(1),
(2) Date: Mar. 31, 2022

(87) PCT Pub. No.: WO2022/215280
PCT Pub. Date: Oct. 13, 2022

(65) Prior Publication Data
US 2024/0111645 A1    Apr. 4, 2024

(30) Foreign Application Priority Data
Apr. 6, 2021   (JP) .................................. 2021-064959

(51) Int. Cl.
*G06F 11/22*    (2006.01)
*G10L 13/00*    (2006.01)
*H04L 12/28*    (2006.01)

(52) U.S. Cl.
CPC ...... *G06F 11/2221* (2013.01); *G06F 11/2294* (2013.01); *G10L 13/00* (2013.01); *H04L 12/2816* (2013.01)

(58) Field of Classification Search
CPC .. G06F 11/2221; G06F 11/2294; G10L 13/00; H04L 12/2816
See application file for complete search history.

(56) References Cited

U.S. PATENT DOCUMENTS

| 7,742,921 B1 * | 6/2010 | Davis ...................... G10L 13/00 |
| | | 704/235 |
| 2003/0093513 A1 * | 5/2003 | Hicks .................. H04L 41/5087 |
| | | 709/224 |

(Continued)

FOREIGN PATENT DOCUMENTS

| JP | 2015-102851 | 6/2015 |
| JP | 2015-164251 | 9/2015 |

(Continued)

OTHER PUBLICATIONS

Decision of Refusal issued Feb. 13, 2024 in Japanese Application No. 2022-519354 (with English machine translation).

(Continued)

*Primary Examiner* — Matthew M Kim
*Assistant Examiner* — Indranil Chowdhury
(74) *Attorney, Agent, or Firm* — Wenderoth, Lind & Ponack, L.L.P.

(57) ABSTRACT

An utterance test method for an utterance device, an utterance test server, an utterance test system, and a program perform an utterance test on a test device (20). The utterance test system includes at least one utterance device (20) capable of uttering, a terminal device (30), and an utterance test server (10). The utterance test server (10) receives an utterance test start command from the terminal device (30), sets at least one utterance device (20) to be a test device (20)

(Continued)

as a target of an utterance test, sets test content of the utterance test, and causes the test device (20) to utter the test content.

17 Claims, 23 Drawing Sheets

(56) References Cited

U.S. PATENT DOCUMENTS

| | | | | |
|---|---|---|---|---|
| 2005/0129194 | A1* | 6/2005 | Creamer | H04M 3/24 379/1.02 |
| 2010/0100385 | A1* | 4/2010 | Davis | G10L 13/00 704/260 |
| 2014/0188486 | A1* | 7/2014 | You | G10L 21/16 704/275 |
| 2016/0192096 | A1 | 6/2016 | Bentley | |
| 2016/0372138 | A1* | 12/2016 | Shinkai | G10L 25/66 |
| 2023/0050159 | A1* | 2/2023 | Lee | G10L 15/26 |
| 2023/0117212 | A1* | 4/2023 | Ohashi | G10L 15/22 704/251 |
| 2024/0135924 | A1* | 4/2024 | Torikai | G10L 15/22 |

FOREIGN PATENT DOCUMENTS

| | | | | |
|---|---|---|---|---|
| JP | 2018-506213 | | 3/2018 | |
| WO | WO-2016052018 A1 | * | 4/2016 | ............ G06F 13/00 |
| WO | 2016/186791 | | 11/2016 | |

OTHER PUBLICATIONS

Office Action issued Jun. 6, 2023 in corresponding Japanese Patent Application No. 2022-519354, with English language translation.
International Preliminary Report on Patentability issued Oct. 10, 2023 in corresponding International (PCT) Patent Application No. PCT/JP2021/026410.
Office Action issued Oct. 24, 2023 in corresponding Japanese Patent Application No. 2022-519354, with English language translation.
International Search Report issued Oct. 19, 2021 in International (PCT) Application No. PCT/JP2021/026410.
Extended European Search Report issued Jul. 19, 2024 in corresponding European Application No. 21870523.4.

* cited by examiner

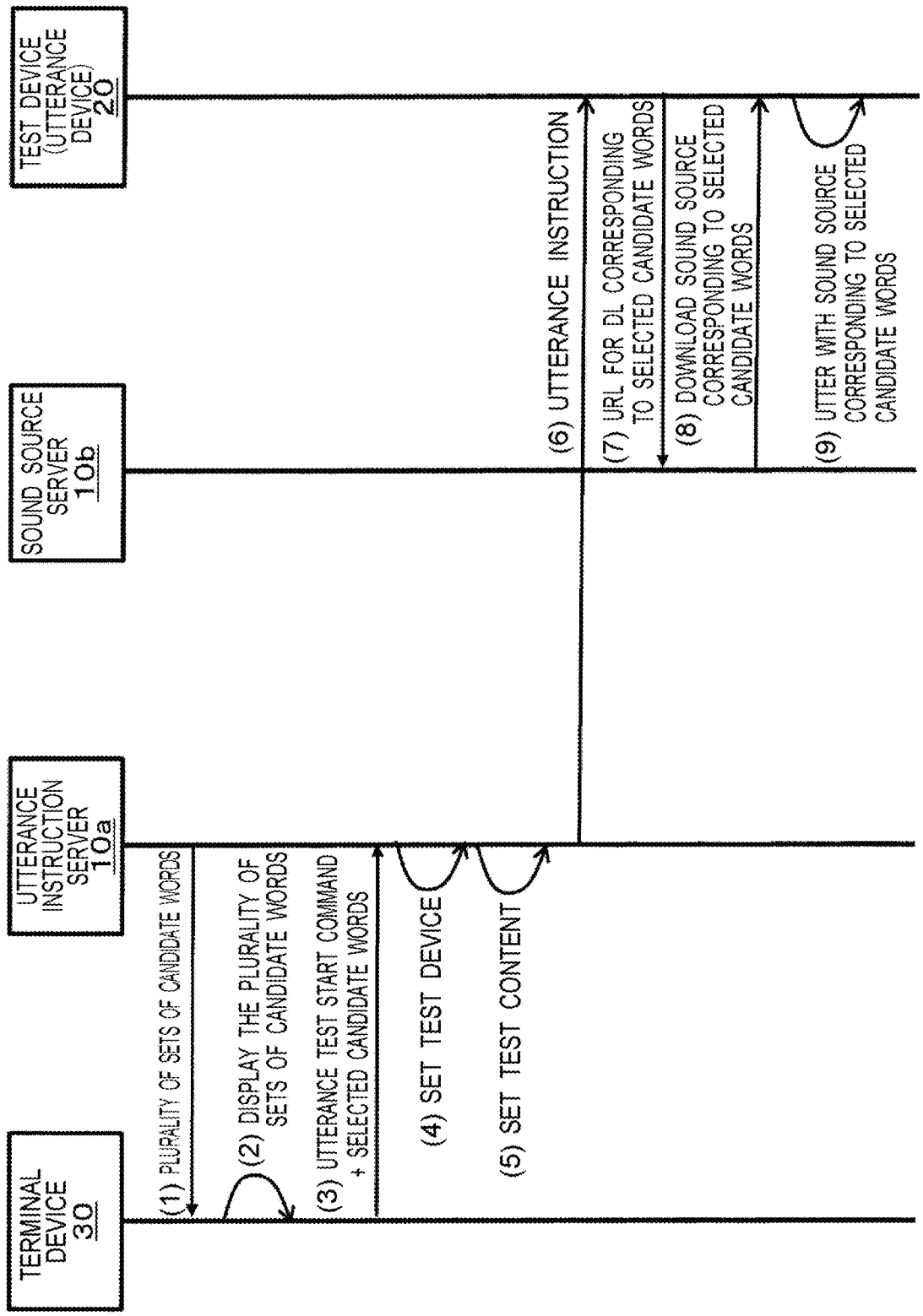

UTTERANCE TEST METHOD FOR UTTERANCE DEVICE, UTTERANCE TEST SERVER, UTTERANCE TEST SYSTEM, AND PROGRAM

TECHNICAL FIELD

The present disclosure relates to an utterance device, and more particularly, to an utterance test method for an utterance device, an utterance test server, an utterance test system, and a program.

BACKGROUND ART

A home appliance is an abbreviation of an electric appliance for home, and is, for example, an electric apparatus such as a television, a refrigerator, an air conditioner, a washing machine, a clearing robot, an acoustic device, a lighting, a water heater, and an intercom used in home. Conventionally, a beep sound or a buzzer sound is used to notify a user of an operation status of a home appliance. For example, when washing of a washing machine is finished, when an air conditioner is started, or when the door of a refrigerator is not completely closed for a predetermined time or more, these home appliances beep to attract user's attention.

Currently, in order to convey more information to the user of a home appliance instead of a beep sound or the like, a home appliance as an utterance device capable of uttering by using voice including a human language has been developed. Such a home appliance is called an utterance home appliance. Instead of a beep sound, the home appliance notifies the user of information relating to the home appliance by uttering, for example, "washing is finished" or "the door of the refrigerator is not closed".

PRIOR ART DOCUMENTS

Patent Documents

Patent Document 1: JP 2015-164251 A

SUMMARY

Problems to be Solved

The technique disclosed in Patent Document 1 relates to a voice system that provides voice data to a plurality of electronic devices (home appliances) having a function of uttering. The voice system determines an electronic device to utter according to whether installation locations of a plurality of the electronic devices are in the same area or different areas. When receiving operation of the user, the voice system sets a volume or sound quality at the time of utterance.

However, the user cannot check how a home appliance utters based on an utterance function set by the user until the home appliance actually utters. For this reason, the user can neither check whether the setting is actually successful, nor know how the home appliance utters and then cannot be prepared.

An object of the present disclosure is to provide an utterance test technique by which setting of utterance of an utterance device can be checked and the user is allowed to experience utterance.

Means for Solving the Problems

In order to solve the above-described problem, the present disclosure provides an utterance test method for an utterance device, an utterance test server, an utterance test system, and a program.

An utterance test method for an utterance device according to one aspect of the present disclosure includes: receiving an utterance test start command from a terminal device; setting, based on the utterance test start command, at least one utterance device to be a test device as a target of an utterance test; setting test content of the utterance test by using voice data or video data according to the set test device; and causing the test device to utter the test content.

Further, an utterance test server of an utterance device according to another aspect of the present disclosure includes a server storage that stores voice data or video data, and includes a server controller. The server controller is configured to receive an utterance test start command from a terminal device; set, based on the utterance test start command, at least one utterance device to be a test device as a target of an utterance test; set test content of the utterance test by using the voice data or video data according to the set test device; and cause the test device to utter the test content.

Further, an utterance test system according to another aspect of the present disclosure includes at least one utterance device capable of uttering, a terminal device, and an utterance test server.

Further, a program according to another aspect of the present disclosure is a program used in a terminal that communicates with an utterance test server.

Effects

In the present disclosure, the user can check setting of utterance, and the user can obtain an utterance experience.

BRIEF DESCRIPTION OF THE DRAWINGS

FIG. 19B is a sequence diagram of another example of the utterance test method for an utterance device in the seventh embodiment.

MODE(S) FOR CARRYING OUT

Figure 1:
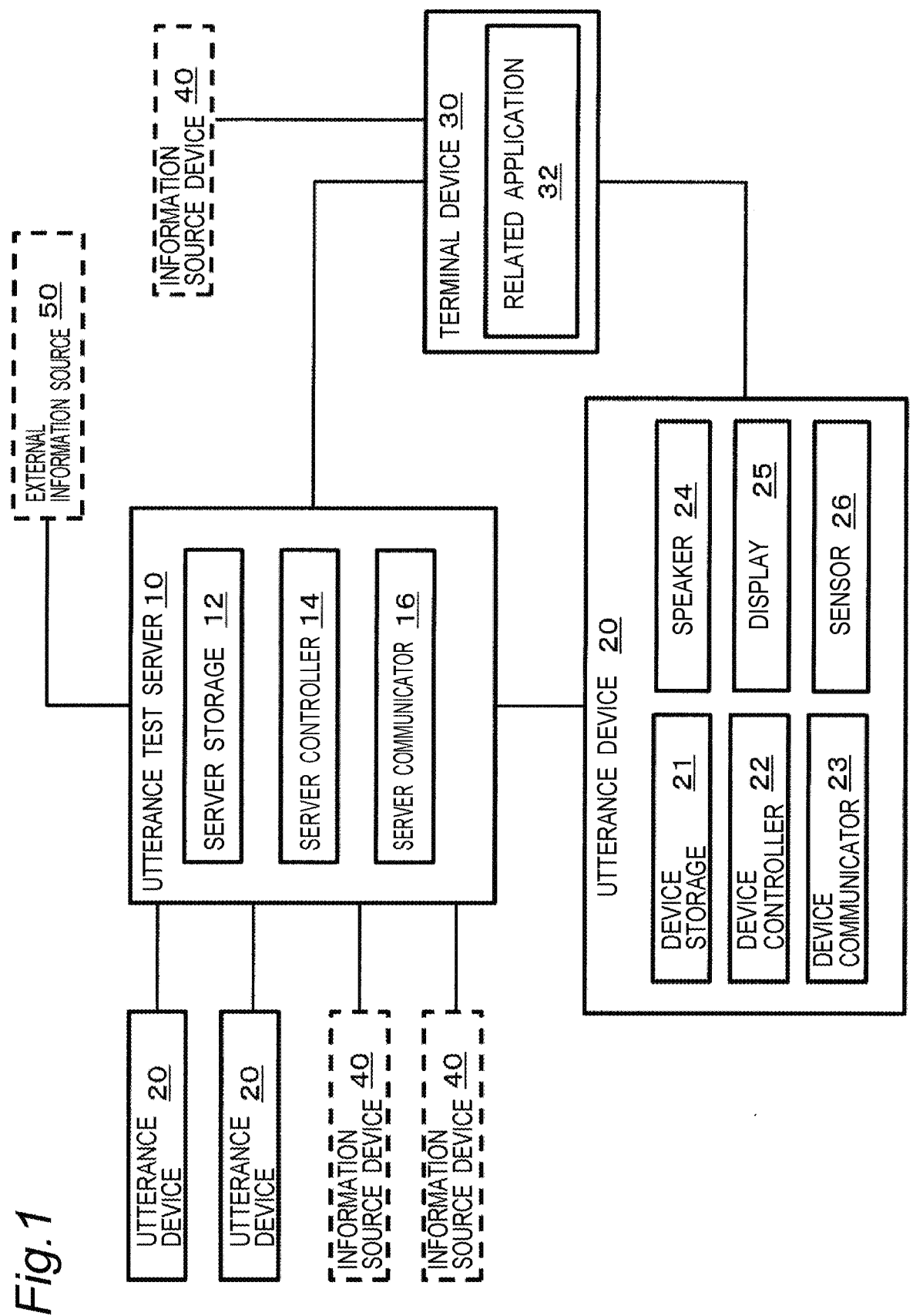
FIG. 1 is a block diagram illustrating a schematic configuration of an utterance test system in a first embodiment.

First, various aspects of an utterance test method for an utterance device, an utterance test server, and an utterance test system will be described.

An utterance test method for an utterance device according to a first aspect of the present disclosure includes: receiving an utterance test start command from a terminal device; setting, based on the utterance test start command, at least one utterance device to be a test device as a target of an utterance test; setting test content of the utterance test by using voice data or video data according to the set test device; and causing the test device to utter the test content.

In the utterance test method for an utterance device according to a second aspect of the present disclosure, in the first aspect, the utterance test start command may include input information of selecting the test device. When setting a test device, the test device may be set, based on the utterance test start command, such that the at least one of the utterance devices designated in the input information of the utterance test start command, all the utterance devices, or the utterance device closest to the user of the terminal device is set as the test device.

In the utterance test method for an utterance device according to a third aspect of the present disclosure, in the first or second aspect, the test content may include at least one of utterance words of the voice data, utterance words of the video data, a volume of an utterance, a frequency component of an utterance, and a speed of an utterance.

In the utterance test method for an utterance device according to a fourth aspect of the present disclosure, in one of the first to third aspects, in the utterance test start command, a plurality of the test devices are set, and order information for performing the utterance test on the plurality of the test devices is included. When causing the test device to utter the test content, each of a plurality of the test devices may be caused to utter the test content in order designated in the order information of the utterance test start command.

In the utterance test method for an utterance device according to a fifth aspect of the present disclosure, in the fourth aspect, when causing the test device to utter the test content, each of a plurality of the test devices may be caused to utter the test content in a manner that, after a test completion notification is received from one test device that is caused to utter, a next one of this test devices in the order information is caused to utter.

The utterance test method for an utterance device according to a sixth aspect of the present disclosure may further include, in any one of the first to fifth aspects, determining whether or not the utterance test fails; and transmitting, in a case where the utterance test is determined to fail, a test failure notification corresponding to a cause of a failure to the terminal device and causing the terminal device to display the test failure notification.

The utterance test method for an utterance device according to a seventh aspect of the present disclosure may further include, in any one of the first to sixth aspects, causing the terminal device to display a setting change user interface; and changing, in a case of receiving a setting change command from the terminal device, the test content based on the setting change command, and causing the test device to utter the changed test content.

The utterance test method for an utterance device according to an eighth aspect of the present disclosure may further include, in any one of the first to seventh aspects, setting additional information based on utterable information of the utterance device (i.e. information capable of being uttered by the utterance device); and causing the test device to utter the additional information together with the test content, or causing the terminal device to display the additional information.

The utterance test method for an utterance device according to a ninth aspect of the present disclosure may further include, in any one of the first to eighth aspects, causing the terminal device to display utterance words of the test content, before receiving the utterance test start command from the terminal device.

An utterance test server of an utterance device according to a tenth aspect of the present disclosure includes a server storage that stores voice data or video data, and a server controller. The server controller is configured to: receive an utterance test start command from a terminal device; set, based on the utterance test start command, at least one utterance device to be a test device as a target of an utterance test; set test content of the utterance test by using the voice data or video data according to the set test device; and cause the test device to utter the test content.

In an utterance test sever for an utterance device according to an eleventh aspect of the present disclosure, in the tenth aspect, an utterance test start command may include input information of selecting the test device. The server controller may be further configured to set, based on the utterance test start command, the test device such that at least one of the utterance devices designated in the utterance nest start command, all the utterance devices, or the utterance device closest to the user of the terminal device to be the test device.

In the utterance test server for an utterance device according to a twelfth aspect of the present disclosure, in the tenth or eleventh aspect, the test content may include at least one of utterance words of the voice data, utterance words of the video data, a volume of an utterance, a frequency component of an utterance, and a speed of an utterance.

In the utterance test server for an utterance device according to a thirteenth aspect of the present disclosure, in one of the tenth to twelfth aspects, in the utterance test start command, a plurality of the test devices are set, and order information for performing the utterance test on the plurality of the test devices is included. The server controller may be further configured to cause each of a plurality of the test devices to utter the test content in order designated in the order information of the utterance test start command when the test device is caused to utter the test content.

In the utterance test server for an utterance device according to a fourteenth aspect of the present disclosure, in the thirteenth aspect, when causing the test device to utter the test content, the server controller may be further configured to cause each of a plurality of the test devices to utter the test content in a manner that, after a test completion notification is received from a test device that is caused to utter, the server controller causes a next one of this test devices in the order information to utter.

In the utterance test server for an utterance device according to a fifteenth aspect of the present disclosure, in any one of the tenth to fourteenth aspects, the server controller may be further configured to: determine whether or not the utterance test fails; and transmit a test failure notification corresponding to a cause of a failure to the terminal device and cause the terminal device to display the test failure notification in a case where the utterance test fails.

In the utterance test server for an utterance device according to a sixteenth aspect of the present disclosure, in any one of the tenth to fifteenth aspects, the server controller may be further configured to: cause the terminal device to display a setting change user interface; and change, when receiving a setting change command from the terminal device, the test content based on the setting change command, and cause the test device to utter the changed test content.

In the utterance test server for an utterance device according to a seventeenth aspect of the present disclosure, in any one of the tenth to sixteenth aspects, the server controller may be further configured to: set additional information based on utterable information of the utterance device; and cause the test device to utter the additional information together with the test content, or cause the terminal device to display the additional information.

In the utterance test server for an utterance device according to an eighteenth aspect of the present disclosure, in any one of the tenth to seventeenth aspects, the server controller may be further configured to cause the terminal device to display utterance words of the test content, before receiving the utterance test start command from the terminal device.

An utterance test system for an utterance device according to a nineteenth aspect of the present disclosure includes at least one utterance device capable of uttering, a terminal device, and the utterance test server according to any one of the tenth to eighteenth aspects.

A program according to a twentieth aspect of the present disclosure is a program used in a terminal that communicates with the utterance test server according to any one of the tenth to eighteenth aspects.

First Embodiment

Hereinafter, a first embodiment of an utterance test method for an utterance device, an utterance test server, and an utterance test system according to the present disclosure will be described in detail with reference to the drawings as appropriate.

The first embodiment described below illustrates an example of the present disclosure. A numerical value, a shape, a configuration, a step, order of steps, and the like shown in the first embodiment below are merely examples, and do not limit the present disclosure. Among components in the first embodiment below, a constituent element not recited in an independent claim indicating the most generic concept is described as an optional constituent element.

In the first embodiment described below, a variation may be shown for a specific element, an appropriate combination of optional configurations is included for other elements, and each effect is achieved in the combined configuration. In the first embodiment, by combining configurations of variations, an effect of each of the variations can be exhibited.

In detailed description below, terms "first", "second", and the like are only used for description, and should not be understood as clearly indicating or implying relative importance or a rank of a technical feature. Features limited to "first" and "second" express or imply including one or more of these features.

FIG. 1 is a block diagram illustrating a schematic configuration of an utterance test system according to the first embodiment. The utterance test system for an utterance device includes an utterance test server 10, at least one utterance device 20 capable of uttering, and a terminal device 30 associated with the utterance device 20. The utterance test server 10 may receive information from at least one information source device 40 or at least one external information source 50, and cause the utterance device 20 to utter based on the diagnosis information. The information source device 40 and the external information source 50 may be included in the utterance test system or does not need to be included in the utterance test system. Hereinafter, an outline of each constituent element will be described.

<Utterance Device 20>

The utterance device 20 is a device having an utterance function. The utterance device 20 of the present embodiment includes a home appliance (utterance home appliance) having an utterance function. The home appliance is an abbreviation of an electric appliance for home. The utterance device 20 may be any type of device as long as it is an electronic device used at home, and includes, for example, an electrical appliance such as a television, a refrigerator, an air conditioner, a washing machine, a cleaning robot, an acoustic device (including a smart speaker), a lighting, a water heater, and an intercom, used at home. The utterance device 20 may be referred to as a "consumer utterance device" or an "utterance home appliance". The utterance function is a function of uttering voice including a human language by using a speaker. The utterance function is different from a function of uttering only a sound such as a beep sound, a buzzer sound, or an alarm, which does not include a human language, and can convey more information to the user by using a human language. The utterance device 20 as an utterance home appliance is configured to exhibit home appliance functions. For example, the utterance device 20, which is an air conditioner, includes a compressor, a heat exchanger, and an indoor temperature sensor, and is configured to exhibit functions of cooling, heating, and dehumidification in a control space. Further, for example, the utterance device 20, which is a cleaning robot, includes a battery, a dust collection mechanism, a movement mechanism, and an object detection sensor, and is configured to perform cleaning while moving within a movable range.

In the embodiment of FIG. 1, the utterance device includes a device storage 21 (home appliance storage) that stores information for exerting the function of the utterance device 20, a device controller 22 (home appliance controller) that controls the entire utterance device 20, a device communicator 23 (home appliance communicator) capable of communicating with the utterance test server 10 or the terminal device 30, and a speaker 24 for uttering. The utterance device 20 may include a display 25 for displaying visual information to the user. Further, the utterance device 20 may include at least one of various sensors 26 to perform its function. Note that, in the present disclosure, the utterance device 20 of this example will be described. However, another one of the utterance device 20 may have a similar configuration.

The device storage 21 is a recording medium that records various pieces of information and control programs, and may be a memory that functions as a work area of the device controller 22. The device storage 21 is realized by, for example, a flash memory, a RAM, other storage device, or an appropriate combination of these. The device storage 21 may store voice data or video data for utterance. The voice data or video data for utterance may be stored before shipment of the utterance device 20, may be read from another storage medium based on a command of a seller or the user in a home, or may be downloaded via the Internet based on a command of a seller or the user.

The device controller 22 is a controller that controls the entire utterance device 20. The device controller 22 includes a general-purpose processor such as a CPU, an MPU, an FPGA, a DSP, or an ASIC that realizes a predetermined function by executing a program. The device controller 22 realizes various types of control in the utterance device 20 by calling and executing a control program stored in the device storage 21. Further, the device controller 22 can read/write data stored in the device storage 21 in cooperation with the device storage 21. The device controller 22 is not limited to one that realizes a predetermined function by the cooperation of hardware and software, and may be a hardware circuit specially designed to realize a predetermined function.

The device controller 22 can receive various setting values (for example, a set temperature of an air conditioner, a display channel of a television, and cleaning time of a cleaning robot) by the user via a setting user interface. The device controller 22 controls each component of the utterance device 20 so as to exhibit a home appliance function of the utterance device 20, based on these setting values, a detection value (for example, indoor temperature, presence or absence of an object) received from various sensors, and the like. The device controller 22 may receive a command from the utterance test server 10 or the terminal device 30 and control the utterance device 20 according to the command. Further, the device controller 22 performs an utterance test in accordance with a command from the utterance test server 10, based on an utterance test method to be described later.

The device communicator 23 can also communicate with the utterance test server 10, the terminal device 30 of the user, and the like, and can also transmit and receive an Internet packet, for example. When cooperating with the utterance test server 10 via the device communicator 23, the device controller 22 can receive a parameter value or a command related to an utterance test from the utterance test server 10 via the Internet.

The speaker 24 converts an electric signal into an acoustic signal by using voice data designated by the device controller 22 and emits the acoustic signal into a space as a sound wave. The device controller 22 may also communicate with the sneaker 24 via a voice interface. The speaker 24 can be appropriately provided based on a type or the like of the utterance device 20. For example, in the utterance device 20 that is a television, the speakers 24 may be provided on both sides of the front of the television. In the utterance device 20 that is a cleaning robot, the speaker 24 can be provided in a housing of the cleaning robot. The speakers 24 of the utterance devices 20 may have different criterions or utterance capability and vocal power. For example, the speaker 24 of the television may have a relatively high utterance and utterance ability, while the speaker 24 of a washing machine may have a relatively low utterance and utterance ability. The present disclosure does not limit the utterance and utterance ability of the speaker 24.

The display 25 is for displaying visual information to the user. The display 25 may be, for example, a display with high resolution for displaying clear video like a screen of a television, or may be a panel display with low resolution for displaying a user interface (UI) for setting on a washing machine or a microwave oven. The present disclosure does not limit display ability of the display 25. Further, the display 25 may be a touch panel having a display function.

The sensor 26 is for acquiring various pieces of information from the outside of the utterance device 20 in order to exhibit a function of the utterance device 20. For example, the sensor 26 may be an indoor temperature sensor that detects a temperature inside a room provided with an air conditioner, an outdoor temperature sensor that detects a temperature outside a room provided with an air conditioner, an object sensor that detects the presence or absence of an object in front of a cleaning robot, an opening and closing sensor that detects whether or not the door of a refrigerator is completely closed, or the like. Information detected by the sensor 26 is input to and stored in the device storage 21, and is then used by the device controller 22 or transmitted to the terminal device 30 or a server.

<Terminal Device 30>

The terminal device 30 is a device related to the utterance device 20. The terminal device 30 may be, for example, a controller of the utterance device 20, or may be a controller capable of simultaneously managing and controlling a plurality of types of home appliance products. Further, the terminal device 30 may be an information terminal capable of performing data communication with the utterance device 20, for example, a smartphone, a portable phone, a mobile phone, a tablet, a wearable device, a computer, or the like in which a dedicated related application 32 is incorporated. The utterance test server or the device controller 22 can acquire setting or a command input by the user via the terminal device 30. Generally, the terminal device 30 includes a display for displaying a graphical user interface (GUI). However, in a case of interacting with the user through a voice user interface (VUI), the terminal device 30 may include a speaker and a microphone instead of or in addition to a display.

<Information Source Device 40>

The information source device 40 is an information source related to content uttered by the utterance device 20. The information source device 40 may be another device (home appliance) in a home where the utterance device 20 is provided. In a case where the information source device 40 is another device, the information source device 40 is also referred to as an information source device (information source home appliance) in the present disclosure. The information source device may be the utterance device 20, or may be a device having no utterance function. The information source device may transmit device information (home appliance information) such as an operation state of the information source device to the utterance test server 10, and the utterance test server 10 may set test content of an utterance test based on the received device information. Further, after the end of the utterance test, during normal use of the utterance device 20, the information source device may transmit the device information to the utterance test server or another server, and the utterance test server 10 or the another server may cause the utterance device 20 to utter based on the received device information. Examples of the device information include an activation state, an operation mode, and abnormality information of the information source device.

<External Information Source 50>

The external information source 50 is an information source that provides information regarding a service not directly involved with an utterance device, for example, weather information or information regarding a delivery status of home delivery. The utterance test server may set test content of an utterance test based on information acquired from the external information source 50. The utterance test server 10, the terminal device 30, or another server may cause the utterance device 20 to utter during normal use of the utterance device 20 based on information acquired from the external information source 50, after the end of the utterance test.

<Utterance Test Server 10>

The utterance test server 10 is a server that performs an utterance test on at least one of the utterance device 20 by using voice data or video data including a human language. In one embodiment, the utterance test server 10 can connect to at least one of the utterance device 20 via the Internet to perform control for an utterance test. For a plurality of the utterance devices 20 provided in the same home or the same selling area, the utterance test server 10 can test a plurality of the utterance devices at a time.

The utterance test server 10 may be used for other purposes than execution of an utterance test method described later. For example, the utterance test server 10 may be a management server of a manufacturer of the utterance device 20 for managing the at least one of the utterance device 20 or for collecting data. Alternatively, the utterance test server 10 may be an application server. In the first embodiment, the utterance test server 10 includes a server storage 12 and a server controller 14. The utterance test server 10 may further include a server communicator 16 for communicating with the utterance device 20, the terminal device 30, the information source device 40, or the external information source 50.

<Server Storage 12>

The server storage 12 is a recording medium that records various pieces of information and control programs, and may be a memory that functions as a work area of the server controller 14. The server storage 12 is realized by, for example, a flash memory, a solid state device (SSD), a hard disk, a RAM, another storage device, or a combination of these as appropriate. The server storage 12 may be a memory inside the utterance test server 10, or may be a storage device connected to the utterance test server 10 by wireless communication or wired communication.

The server storage 12 stores voice data or video data for an utterance test. Voice data or video data for various utterance tests can be generated according to a type of a test device (test home appliance) as a target of an utterance test, a type of the information source device 40, a type of the external information source 50, and the like. In one embodiment, before an utterance test, the utterance test server 10 generates voice data or video data for an utterance test in advance and stores the data in the server storage 12. In another embodiment, the utterance test server generates voice data or video data for an utterance test dynamically (at the time of execution) during execution of the utterance test, and stores the data in the server storage 12. The server storage 12 may store material data for generating the voice data or the video data, or intermediate data. Further, the server storage 12 of the utterance test server 10 may store voice data or video data used when the utterance device 20 is caused to utter during normal use of the utterance device 20 after the end of a test.

The server storage 12 also stores setting information (for example, test content such as a sound volume to be described later) for an utterance test. After the end of an utterance test, in a case where the utterance test server 10 causes the utterance device 20 to utter based on device information and the like during normal use of the utterance device 20, setting and information for utterance are stored.

<Server Controller 14>

The server controller 14 of the utterance test server 10 is a controller that controls the entire utterance test server 10. The server controller 14 includes a general-purpose processor such as a CPU, an MPU, a GPU, an FPGA, a DSP, or an ASIC that realizes a predetermined function by executing a program. The server controller 14 realizes various types of control in the utterance test server 10 by calling and executing a control program stored in the server storage 12. Further, the server controller 14 can read/write data stored in the server storage 12 in cooperation with the server storage 12. The server controller 14 is not limited to one that realizes a predetermined function by the cooperation of hardware and software, and may be a hardware circuit specially designed to realize a predetermined function.

<Server Communicator 16>

The server communicator 16 can also transmit and receive an Internet packet to and from, that is, communicate with the utterance device 20, the terminal device 30, the information source device 40, the external information source 50, and the like in cooperation with the server controller 14. For example, the utterance test server 10 may receive a command from the terminal device 30 via the server communicator 16, may transmit an instruction to the utterance device 20, or may receive information from the information source device 40 or the external information source 50. The server communicator 16 or the device communicator 23 may perform communication according to a standard such as Wi-Fi (registered trademark), IEEE 802.2, IEEE 802.3, 3G, or LTE with the utterance test server 10, the utterance device 20, the terminal device 30, the information source device 40, and the external information source 50 to transmit and receive data. The server communicator 16 or the device communicator 23 may perform communication with an intranet, an extranet, a LAN, an ISDN, a VAN, a CATV communication network, a virtual dedicated network, a telephone line network, a mobile communication network, a satellite communication network or the like, infrared light, and Bluetooth (registered trademark), in addition to the Internet.

<Utterance Test Method for Utterance Device>

Figure 2:
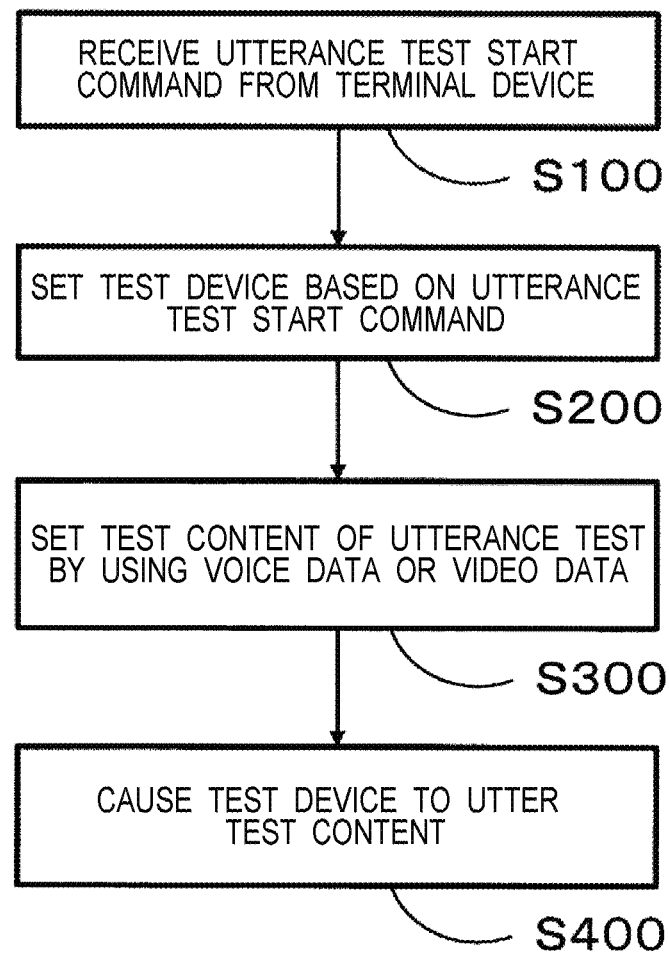
FIG. 2 is a flowchart of an example of an utterance test method for an utterance device in the first embodiment.
Figure 3:
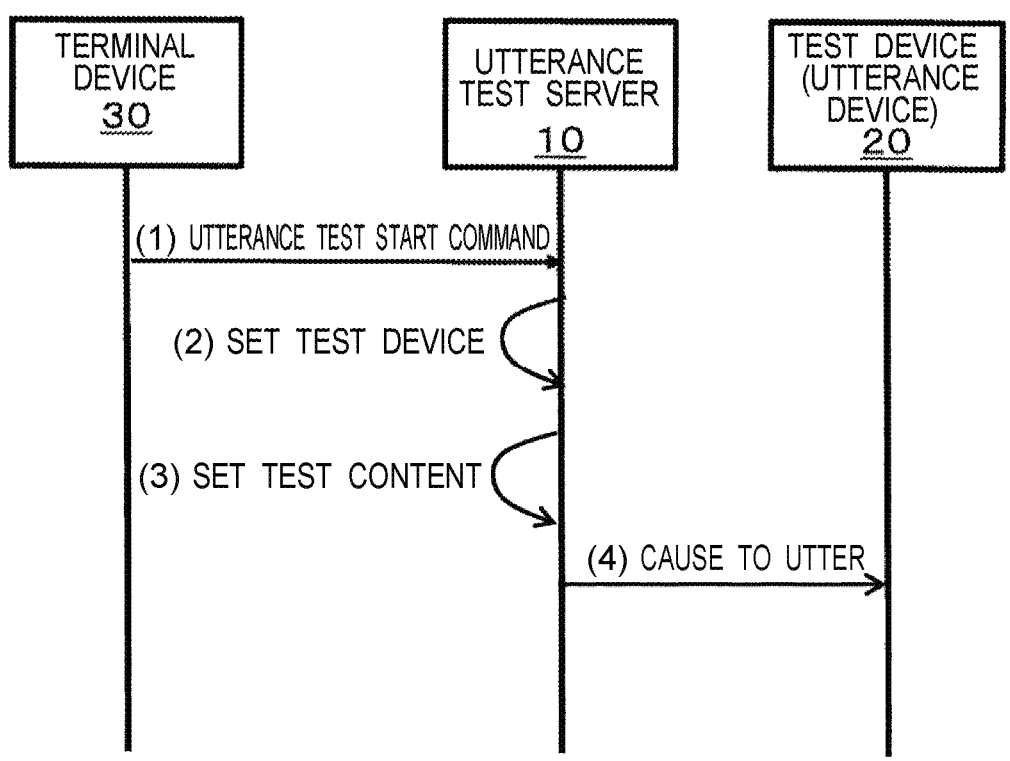
FIG. 3 is a sequence diagram of an example of the utterance test method for an utterance device in the first embodiment.

The utterance test server 10 executes an utterance test method for an utterance device using the server storage 12 and the server controller 14. FIG. 2 is a flowchart of the utterance test method for an utterance device in the first embodiment, and the utterance test method for an utterance device includes Steps S100 to S400 below. FIG. 3 is a sequence diagram of an example of the utterance test method for an utterance device in the first embodiment, and corresponds to a flowchart in FIG. 2.

Figure 4:
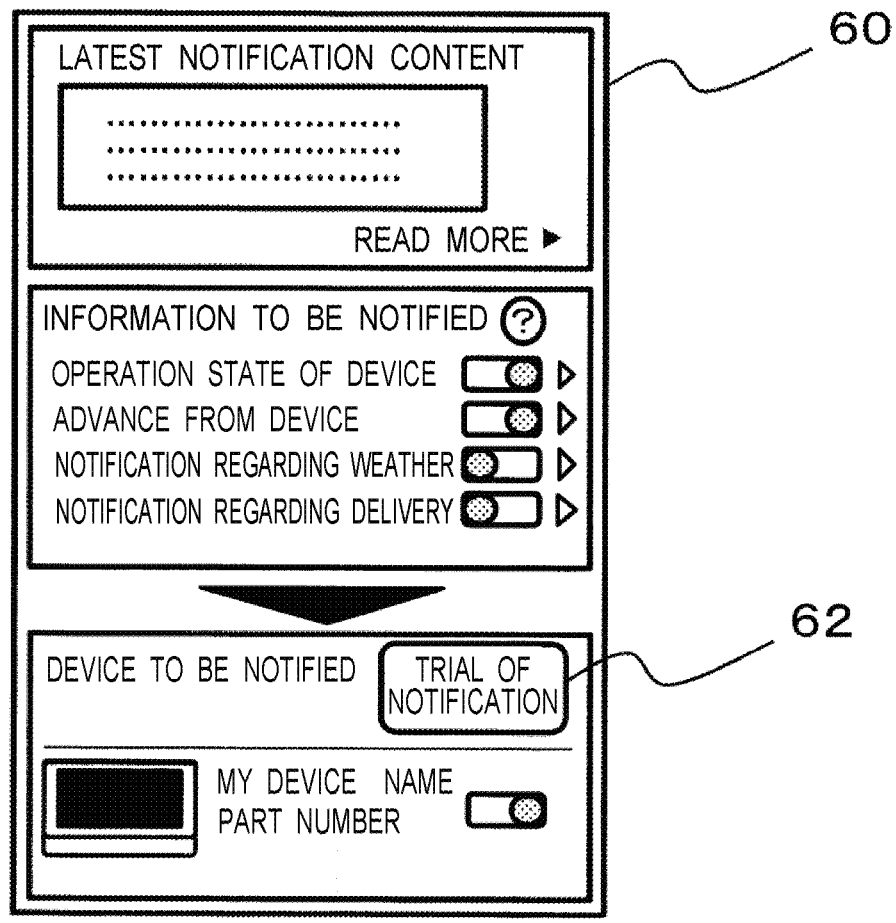
FIG. 4 is an example of a user interface of a terminal device in the first embodiment.

First, the user can start an utterance test via a UI of the terminal device 30. The server controller 14 receives an utterance test start command from the terminal device 30 related to the utterance device 20 via the server communicator 16 (Step S100). For example, FIG. 4 is an example of a UI of the terminal device 30 in the first embodiment, and illustrates a screen 60 of the terminal device 30. The UI displays information related to an utterance device and content to be uttered. In the UI of FIG. 4, a button 62 of "Trial of notification" is provided, and when the user presses this button, the terminal device generates input information based on user input and puts the input information into an utterance test start command. Then, the terminal device 30 transmits the utterance test start command to the utterance test server 10, and an utterance test starts. Note that communication of instruction and information between the utterance test server 10 and the terminal device 30 may be performed indirectly via another server or the like.

Next, based on input information of the utterance test start command, the server controller 14 sets at least one of the utterance device 20 to be a test device, and the test device is a target of an utterance test (Step S200). Hereinafter, the utterance device 20 set as a target of an utterance test may be indicated as the test device 20. In a case where there are a plurality of the utterance devices 20 that may be a target of an utterance test in a home, the server controller 14 selects at least one of the utterance devices as the test device. More specifically, based on the utterance test start command, the server controller 14 may set at least one of the utterance devices designated by input information of the utterance test start command, all the utterance devices 20, or the utterance device 20 closest to the user of the terminal device, to be the test device.

In one embodiment, the user can select the utterance device 20 for which to perform a test via a UI of the terminal device 30. In this case, the utterance test start command includes input information of selecting a test device. The input information may include, for example, an identifier of the selected utterance device 20. The server controller 14 sets the designated utterance device 20 as a test device based on the identifier included in input information of the utterance test start command.

In another embodiment, the server controller 14 sets all the utterance devices 20 that may be a target of an utterance test as test devices.

In still another embodiment, the server controller 14 sets the utterance device 20 closest to the user of the terminal device 30 as a test device. For example, in a case where the utterance device 20 includes a human sensor, the utterance device 20 may use the human sensor to detect whether or not the user is within a predetermined range or detect a distance to the user. Alternatively, the utterance device 20 can acquire the position of the terminal device 30 by using Bluetooth (registered trademark) or a GPS technique, and estimate the position of the terminal device as the position of the user. The utterance device 20 transmits a detected or estimated result to the utterance test server 10. Based on the received information, the server controller 14 identifies the utterance device 20 closest to the user among the utterance devices 20 that can be a target of an utterance test, and sets the closest utterance device 20 as a test device. Note that the server controller 14 may set a plurality of the utterance devices closest to the user as a test device.

By using the voice data or the video data, the server controller 14 sets test content of an utterance test determined based on the set test device (Step S300). In the present disclosure, the voice data or the video data is data including a human language. Further, although an example of performing an utterance test by using voice data will be mainly described, the utterance test can be performed by using video data instead of the voice data or in addition to the voice data based on a similar method. For example, in a case where the test device includes a display, an utterance test may be performed with video data. Further, in description below, the voice data may be abbreviated as a "sound source". The "sound source" described in the present disclosure refers to voice data stored in the server storage 12 or the device storage 21, voice data for an utterance test generated by the utterance test server 10, or voice data used during normal use of the utterance device 20 after the end of an utterance test generated by the utterance test server 10.

Test content that can be set in the server controller 14 is content of voice data or video data used for an utterance test, and specifically, may include utterance words (text; or utterance specifications. More specifically, the utterance words may include utterance words of voice data or utterance words of video data. The utterance specifications may include at least one of a volume of an utterance, a frequency component of an utterance, and a speed of an utterance. Voice in voice data or video data may be synthesized voice or human voice recorded in advance. The utterance words are words to be uttered, for example, words such as "This is a test utterance. It is notified by voice like this". The server controller 14 may set utterance words based on a type of a test device. For example, in a case where the test device is a cleaning robot, the utterance words may be set to "This is a test utterance for a robot vacuum cleaner". Further, the utterance words may include a language of the words, gender, age, voice quality, a type of the words, and the like.

In one embodiment, the user can designate at least one item of test content via a UI of the terminal device 30. In this case, the utterance test start command may include the designated item and content of the item. For example, the utterance test start command may include an item and content of "language: Japanese", "gender: female", and "volume: medium". The server controller 14 sets test content based on an item and content included in the utterance test start command.

Setting test content includes determining at least one matter for the test content, selecting voice data corresponding to determined test content in voice data stored in the server storage 12, and/or generating voice data (sound source) based on the determined test content.

Next, the server controller 14 transmits an utterance instruction to a test device, and causes the test device to utter the test content (Step S400). In one embodiment, voice data (sound source) corresponding to set test content may be stored in the server storage 12 and downloaded to the test device. In this case, the server controller 14 transmits a uniform resource locator (URL) of the voice data to the test device. The utterance instruction includes the URL for download. The test device downloads and utters the designated URL sound source data. In another embodiment, the server controller 14 transmits the voice data to the test device, and the test device utters by using the received voice data. In still another embodiment, voice data corresponding to various pieces of test content is already stored in the device storage 21, and the server controller 14 transmits set test content or related information to the test device. The test device selects and utters corresponding voice data based on the received test content or related information.

In one embodiment, a terminal that communicates with the utterance test server 10, for example, the utterance device 20 or the terminal device 30 has a program used to execute the utterance test as described above.

This completes control of an utterance test. After the utterance test ends, during normal use of the utterance device 20, the utterance test server 10 can cause the utterance device 20 to utter with the same setting as that at the time of the test, based on device information regarding a specific one of the utterance devices 20, device information of another one of the utterance devices 20, or information from the external information source 50. For example, as in the test, the home utterance device 20 is caused to utter with setting of "language: Japanese", "gender: female", and "volume: medium". In this way, the user can check setting for the utterance, and later, the user can obtain an utterance experience according to the checked setting.

Second Embodiment

<Case where Utterance Test Server 10 Includes Plurality of Servers>

In a second embodiment, the utterance test server 10 includes a plurality of servers having different roles.

Figure 5:
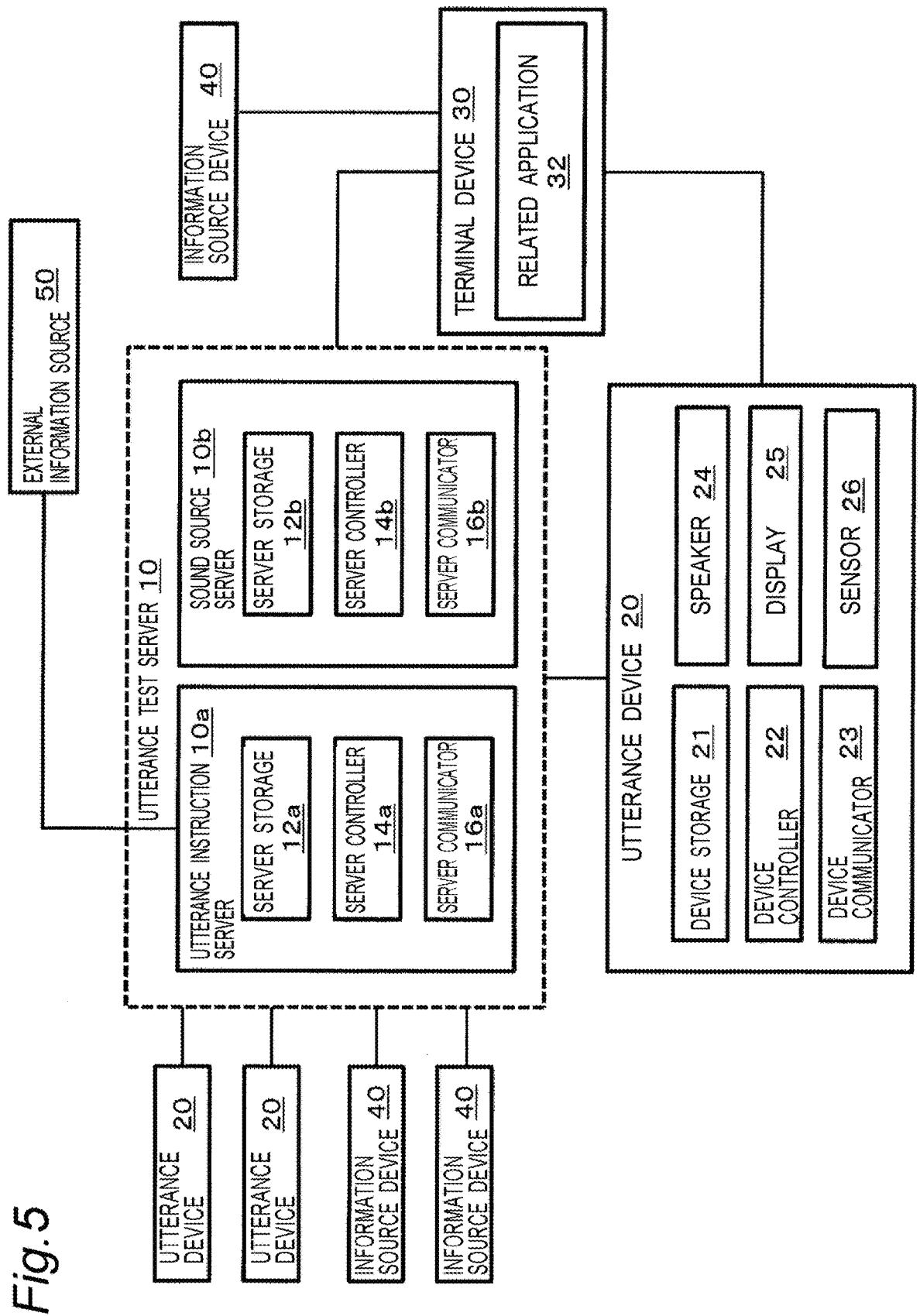
FIG. 5 is a block diagram illustrating a schematic configuration of the utterance test system in a second embodiment.

FIG. 5 is a block diagram illustrating a schematic configuration of an utterance test system in the second embodiment. In the second embodiment, the utterance test server 10 includes an utterance instruction server 10*a* and a sound source server 11*b*. The utterance instruction server 10*a* includes a server storage 12*a*, a server controller 14*a*, and a server communicator 16*a*. The utterance instruction server 10*b* includes a server storage 12*b*, a server controller 14*b*, and a server communicator 16*b*. In the utterance test method, the sound source server 1-*b* performs operation related to generation, storage, and download of voice data (sound source) for an utterance test. In contrast, the utterance instruction server 10*a* performs remaining operation, for example, communication between the utterance device 20 and the terminal device 30.

Figure 6:
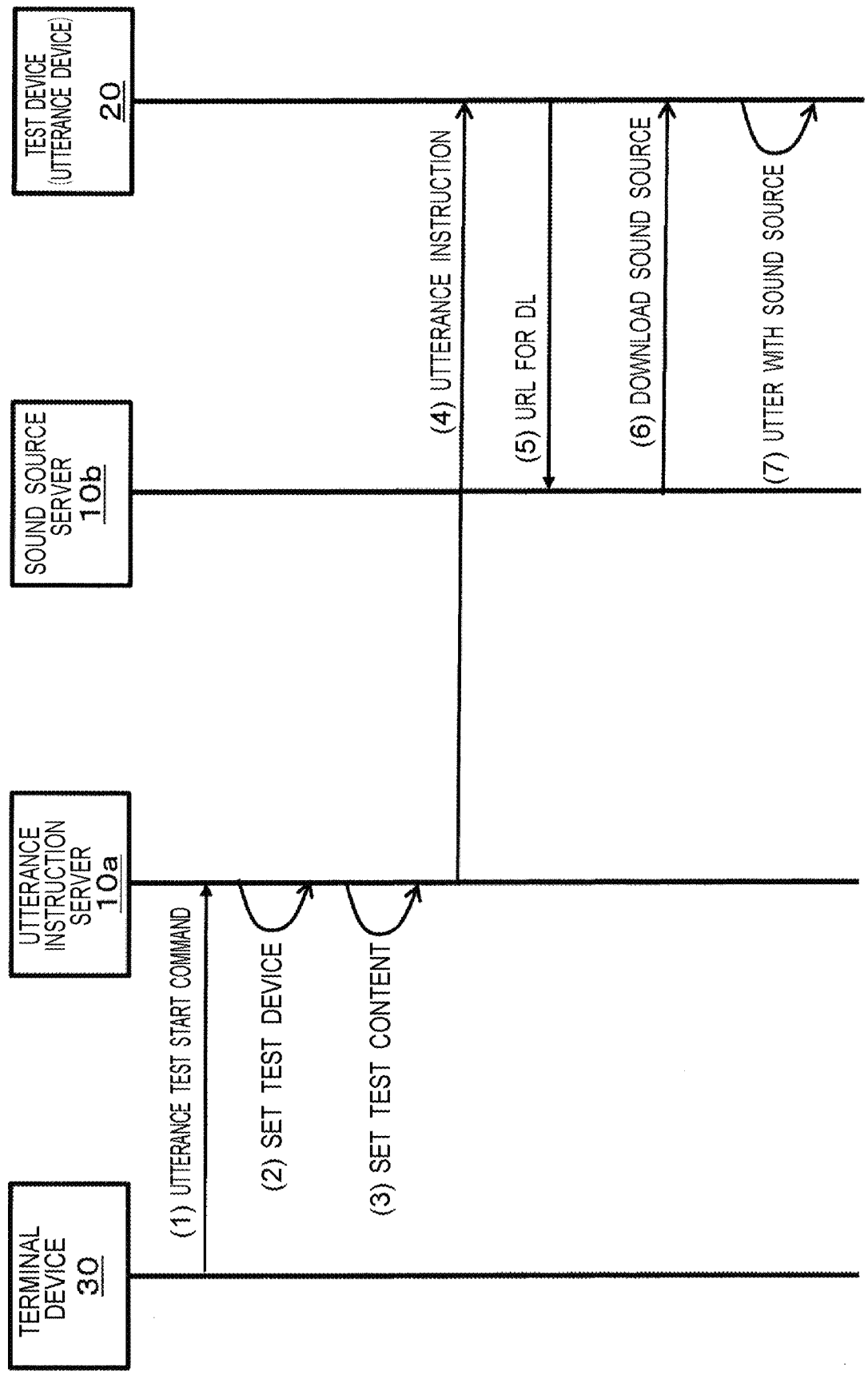
FIG. 6 is a sequence diagram of an example of the utterance test method for an utterance device in the second embodiment.

FIG. 6 is a sequence diagram of an example of the utterance test method for an utterance device in the second embodiment. The utterance instruction server 10*a* receives an utterance test start command from the terminal device 30, sets a test device and test content based on the utterance test start command, and transmits an utterance instruction to the test device. In the embodiment of FIG. 6, a sound source to be used for an utterance test is stored in the server storage 12*b* of the sound source server 10*b*, and the utterance instruction includes a URL for downloading the sound source ("URL for DL"). Upon receiving the utterance instruction, the test device downloads the sound source from the sound source server 10*b* based on the URL for DL, and utters with the sound source so as to perform an utterance test.

In this manner, processing load on each server in the utterance test server 10 can be reduced. Further, each of the utterance test servers 10 only needs to have a configuration for performing corresponding operation, and for example, the utterance instruction server 10*a* does not need to include hardware for generating a sound source. This configuration facilitates retention and maintenance of the entire utterance test server 10.

Note that a function of the utterance test server may be shared by a plurality of servers from a viewpoint different from that in FIG. 6. For example, the utterance test server 10 may include an utterance instruction server, a sound source generation server, and a sound source distribution server. In this case, the sound source generated by the sound source generation server is stored in the server storage of the sound source distribution server and downloaded to the test device.

Third Embodiment

<Case of Plurality of Test Devices>

In a third embodiment, a plurality of test devices are set, and the utterance test server 10 causes a plurality of the test devices to perform an utterance test in order.

Figure 7:
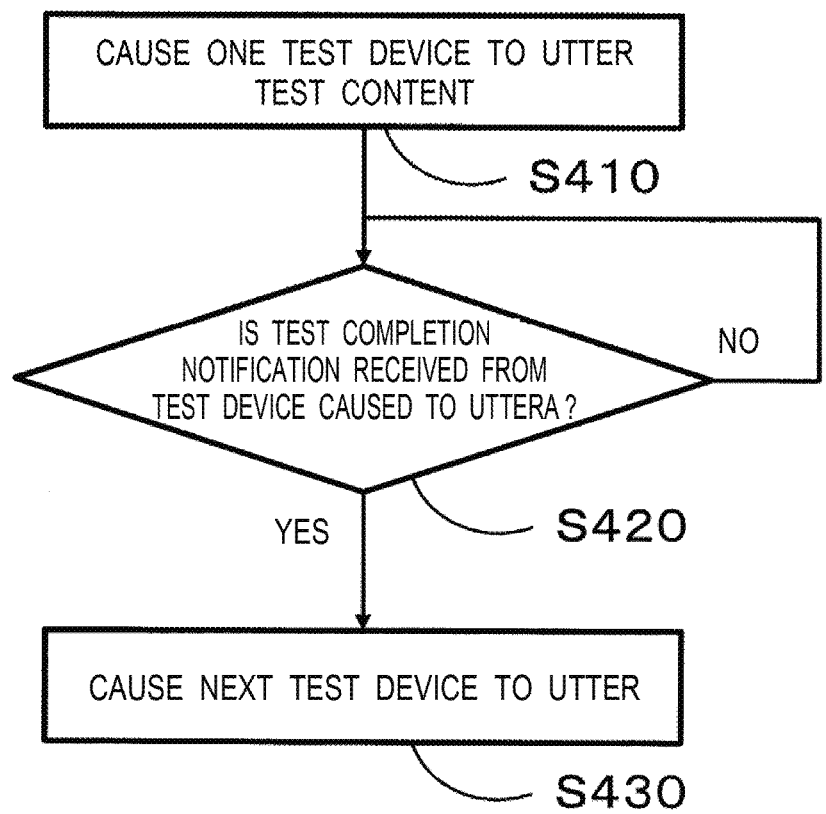
FIG. 7 is a flowchart of an example of Step S400 in a third embodiment.
Figure 8:
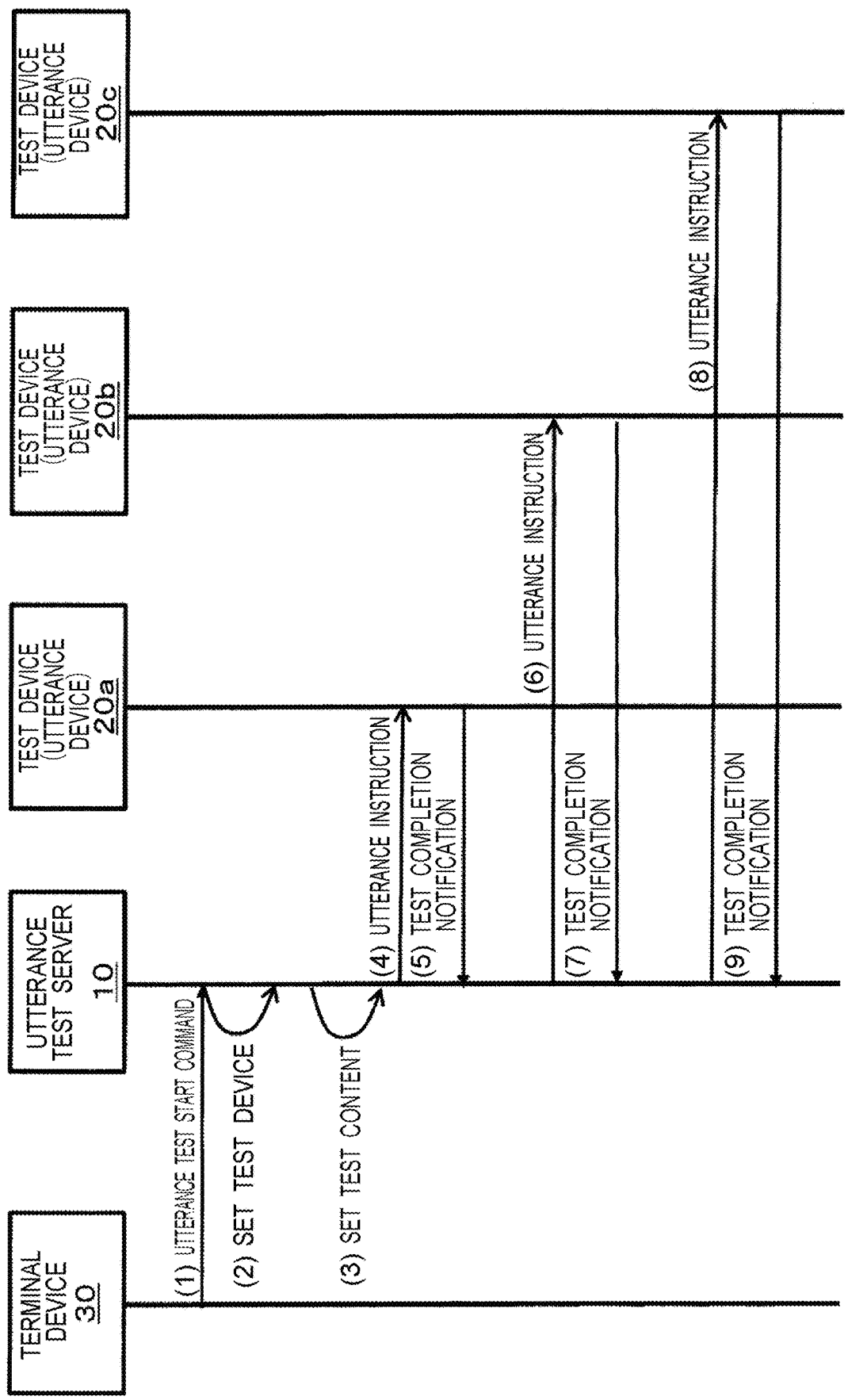
FIG. 8 is a sequence diagram of an example of the utterance test method for an utterance device in the third embodiment.

FIG. 7 is a flowchart of an example of Step S400 in the third embodiment, and FIG. 8 is a sequence diagram of an example of the utterance test method for an utterance device in the third embodiment. The utterance test server performs Step S100 similarly to the first embodiment.

In Step S200, the utterance test server 10 sets a plurality of test devices based on the utterance test start command. For example, an utterance device 20*a*, an utterance device 20*b*, and an utterance device 20*c* may be provided in a home, and the utterance test server 10 may set all of them as test devices.

Figure 9:
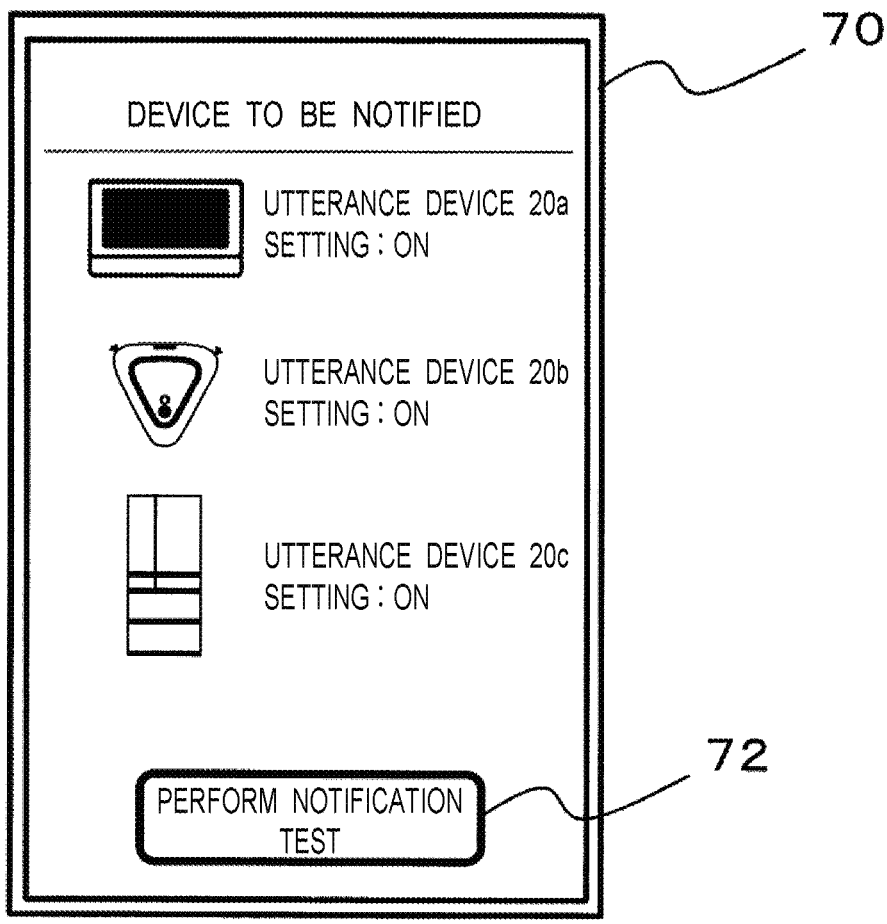
FIG. 9 is an example of a user interface of the terminal device in the third embodiment.

In one embodiment, a plurality of the utterance devices 20 selected by the user via a UI of the terminal device 30 are set as test devices. FIG. 9 is an example of a UI of the terminal device 30 in the third embodiment, and illustrates a screen 70 of the terminal device 30. For example, the user can set the utterance device 20*a*, the utterance device 20*b*, and the utterance device 20*c* to "on" via the UI. In the UI of FIG. 9, a button 72 of "Perform notification test" is provided, and when the user presses this button, the terminal device 30 transmits the utterance test start command including identifiers of the utterance devices 20 set to "on" to the utterance test server 10.

In one embodiment, the user may designate utterance order via the U. of the terminal device 30. In this case, the terminal device 30 generates order information based on the order designated by the user, puts the order information into the utterance test start command, and transmits the utterance test start command to the utterance test server 10. Therefore, in the utterance test start command, a plurality of test devices are set, and the order information for performing an utterance test on a plurality of the test devices is included. In a case where the user does not particularly designate the utterance test start command, the terminal device 30 may set, as the utterance order, order from top to bottom of the utterance devices 20 that are set to "on" displayed on the UI (in FIG. 9, the order of the utterance device 20*a*, the utterance device 20*b*, and the utterance device 20*c*), and may transmit the utterance test start command including this order information to the utterance test server 10.

In Step S300, the utterance test server 10 may set similar test content for a plurality of test devices, or may set different test content for at least one test device.

In Step S400, a plurality of test devices can be simultaneously caused to utter. However, a plurality of test devices may be sequentially caused to utter so that the user can hear an utterance test well. In the embodiment of FIGS. 7 and 8, each test device transmits a test completion notification to the utterance test server 10 when the utterance test is completed. After receiving the test completion notification from the test device that is caused to utter, the utterance test server 10 causes each of a plurality of test devices to utter test content so as to cause a next test device to utter.

More specifically, the utterance test server 10 causes one test device (for example, the test device 20*a*) to utter the test content (Step S410). Then, the utterance test server 10 determines whether or not the test completion notification is received from the test device that is caused to utter previously (Step 3420). Upon receiving the test completion notification from the test device previously caused to utter, the utterance test server 10 causes a next test device (for example, the test device 20*b*) to utter (Step S430).

In Step S400, the utterance test server 10 may cause each of a plurality of the test devices to utter the test contents in the order designated in the utterance test start command order information. Note that, in a case where there is no order information in the utterance test start command, the utterance test server 10 may cause test devices to utter in ascending order or descending order of numbers of identifiers of the test devices, or in ascending order or descending order of distances between the test devices and the user.

In one embodiment, a test device does not transmit a test completion notification. When predetermined time elapses after transmitting an utterance instruction to one test device, the utterance test server 10 transmits an utterance instruction to a next test device.

Note that, in a case where order of utterances is determined before the start of a test, a test device other than the test device to utter last (for example, the test device 20*c*) may set test content to present the test device to utter next is presented. For example, in the embodiment of FIGS. 8 and 9, the utterance test is performed on the test device 20*a* (television), the test device 20*b* (cleaning robot), and the test device 20*c* (refrigerator) in this order. In this case, the utterance test server 10 causes the test device 20*a* to utter "Next, the cleaning robot utters" during the test, and causes the test device 20*b* to utter "Next, the refrigerator utters" during the test.

In this manner, the utterance test server 10 completes the processing of causing a plurality of test devices to utter. In this way, the user can check setting for the utterance for a plurality of the utterance devices 20, and later, the user can obtain an utterance experience according to the checked setting.

Fourth Embodiment

<Case of Test Failure>

In a fourth embodiment, for example, in a case where the utterance test fails due to a failure occurring in the test, the server controller 14 can notify the user that the test has failed. Further, the server controller 14 may attempt to identify the cause of the failure and notify the user of the identified cause of the failure.

First, a possible cause of the failure will be described. (First cause of failure) An utterance instruction is not received or recognized by a test device. For example, a case where an utterance instruction is not received due to an Internet failure or a malfunction of the server communicator 16 or the device communicator 23 may occur. For example, in a case where some incompleteness or damage occurs in a format of an utterance instruction at the time of generation or transmission of the utterance instruction, the device controller 22 cannot recognize content of the received utterance instruction. (Second cause of failure) A test device cannot acquire a sound source to be used for a test. For example, there may be a case where a sound source cannot be downloaded due to an Internet failure, a malfunction of the server communicator 16 or the device communicator 23, a lack of a storage space in the device storage 21, an error in designation of a URL for downloading, or the like. (Third cause of failure) There may be a case where utterance cannot be made due to a malfunction of a component such as the speaker 24 of a test device.

Figure 10:
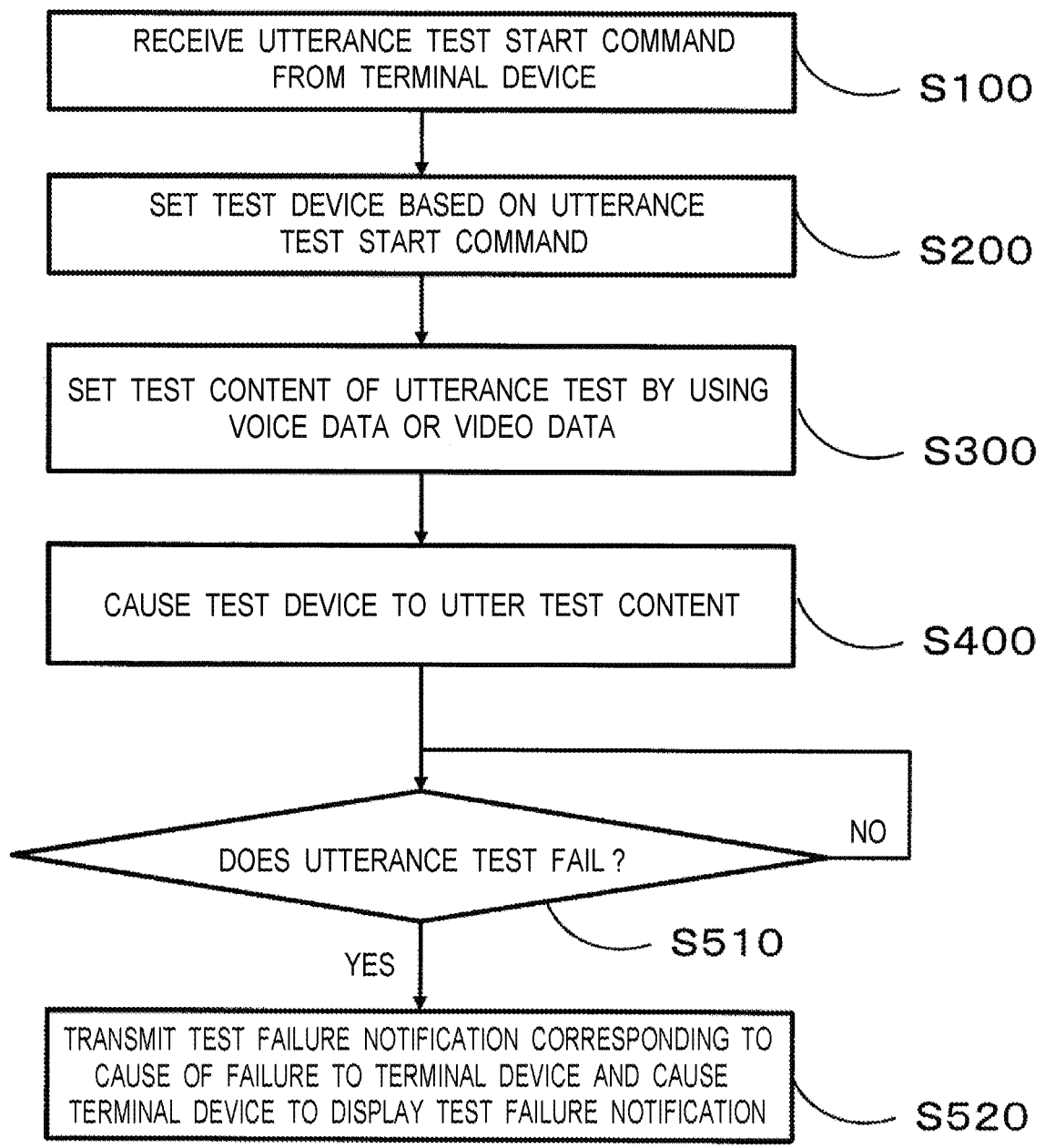
FIG. 10 is a flowchart of an example of the utterance test method for an utterance device in a fourth embodiment.
Figure 11:
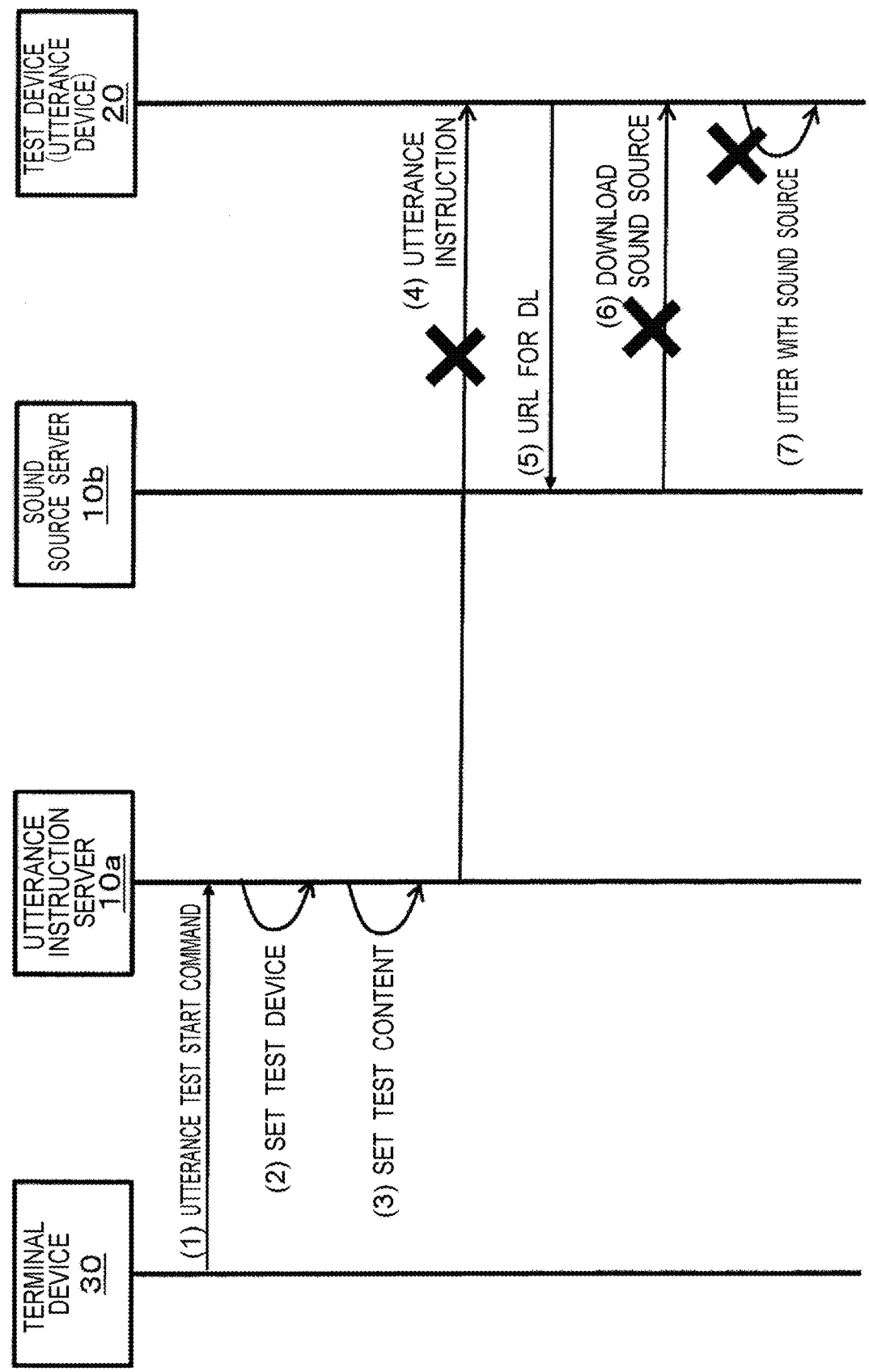
FIG. 11 is a sequence diagram of an example of the utterance test method for an utterance device in the fourth embodiment.

Next, processing performed by the server controller 14 will be described. FIG. 10 is a flowchart of an example of the utterance test method for an utterance device in the four-Uh embodiment, and FIG. 31 is a sequence diagram of an example of the utterance test method for an utterance device in the fourth embodiment. After causing a test device to utter test content, the server controller 14 determines whether or not an utterance test has failed (Step S510). In one embodiment, in a case where a test end notification is not received from a test device within predetermined time after transmitting an utterance instruction to the test device, the server controller 14 determines that the test has failed. In another example, a test device transmits a test failure notification (and information related to a cause of the test failure to the utterance test server 10 when detecting that an utterance instruction is not acquired or recognized, that a sound source cannot be downloaded, or that the speaker 24 cannot utter. When the server controller 14 receives the test failure notification via the server communicator 16, the server controller 14 determines that the utterance test has failed.

Figure 12:
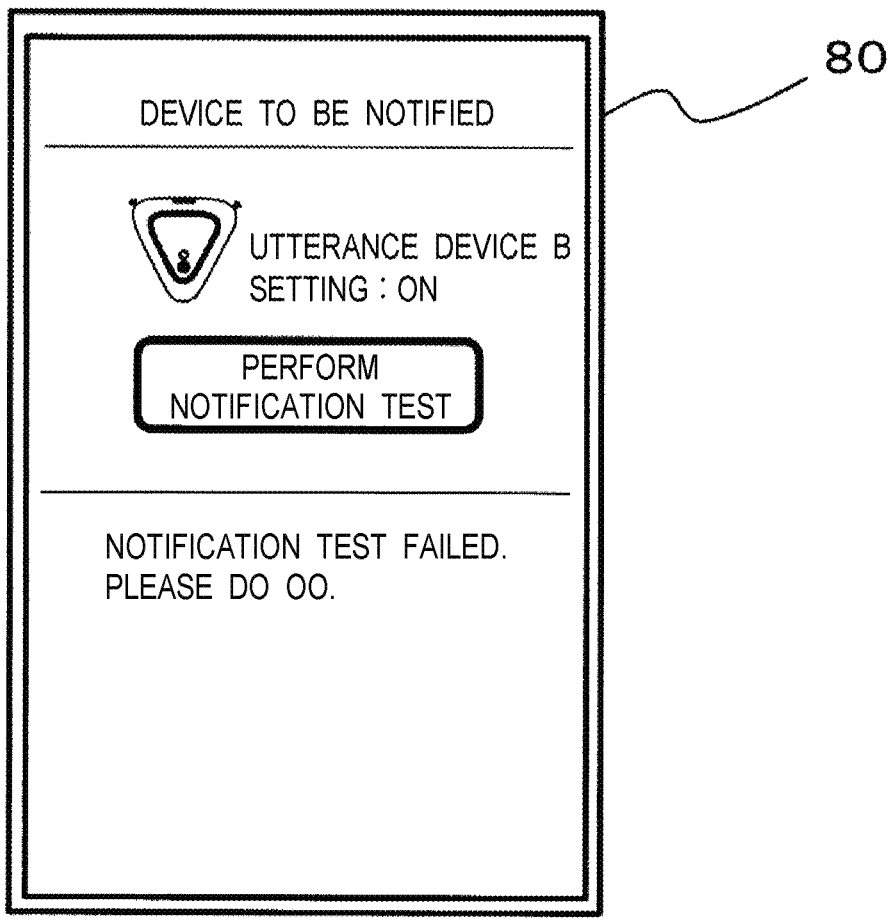
FIG. 12 is an example of a user interface of the terminal device in the fourth embodiment.

In a case where an utterance test fails, the server controller 14 transmits a test failure notification corresponding to a cause of the failure to the terminal device 30 and causes the UI of the terminal device 30 to display the test failure notification (Step S520). FIG. 12 is an example of a UI of the terminal device 30 in the fourth embodiment, and illustrates a screen 80 of the terminal device 30. The server controller 14 may classify possible causes of the failure so that the user can easily handle the cause, and display the classified causes on the terminal device 30. For example, when a network connection failure is regarded as a cause of the failure, a test failure notification "Test notification failed. Please check network connection" may be displayed. When a malfunction of a test device itself is regarded as a cause of the failure, a test failure notification "Test notification failed. Please check a state or setting of the test device" may be displayed. Further, when download is considered to have failed due to a malfunction of the server, a test failure notification "Test notification failed. Download of the test sound source failed" may be displayed.

In this manner, the server controller 14 completes processing at the time of test failure. In this way, even if an utterance test fails, feedback can be given to the user using the test failure notification, and the user can be relieved. Further, by displaying information related to a cause of the failure, it is possible to prompt the user to eliminate the cause and perform the utterance test again.

Fifth Embodiment

<Case of Retest by Setting Change>

In a fifth embodiment, upon receiving a result of an utterance test, the user can perform the test again after changing utterance setting.

Figure 13:
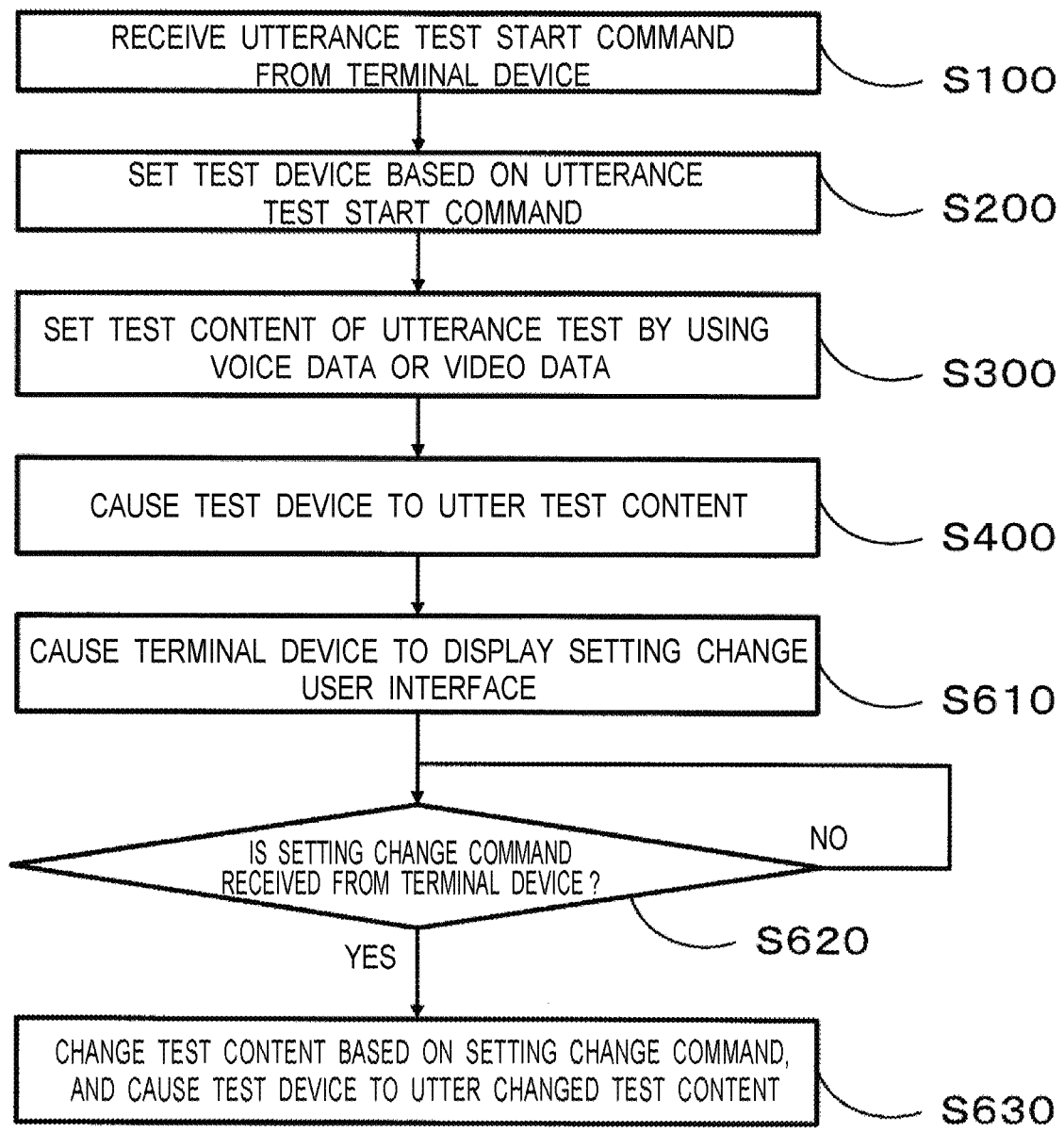
FIG. 13 is a flowchart of an example of the utterance test method for an utterance device in a fifth embodiment.
Figure 14:
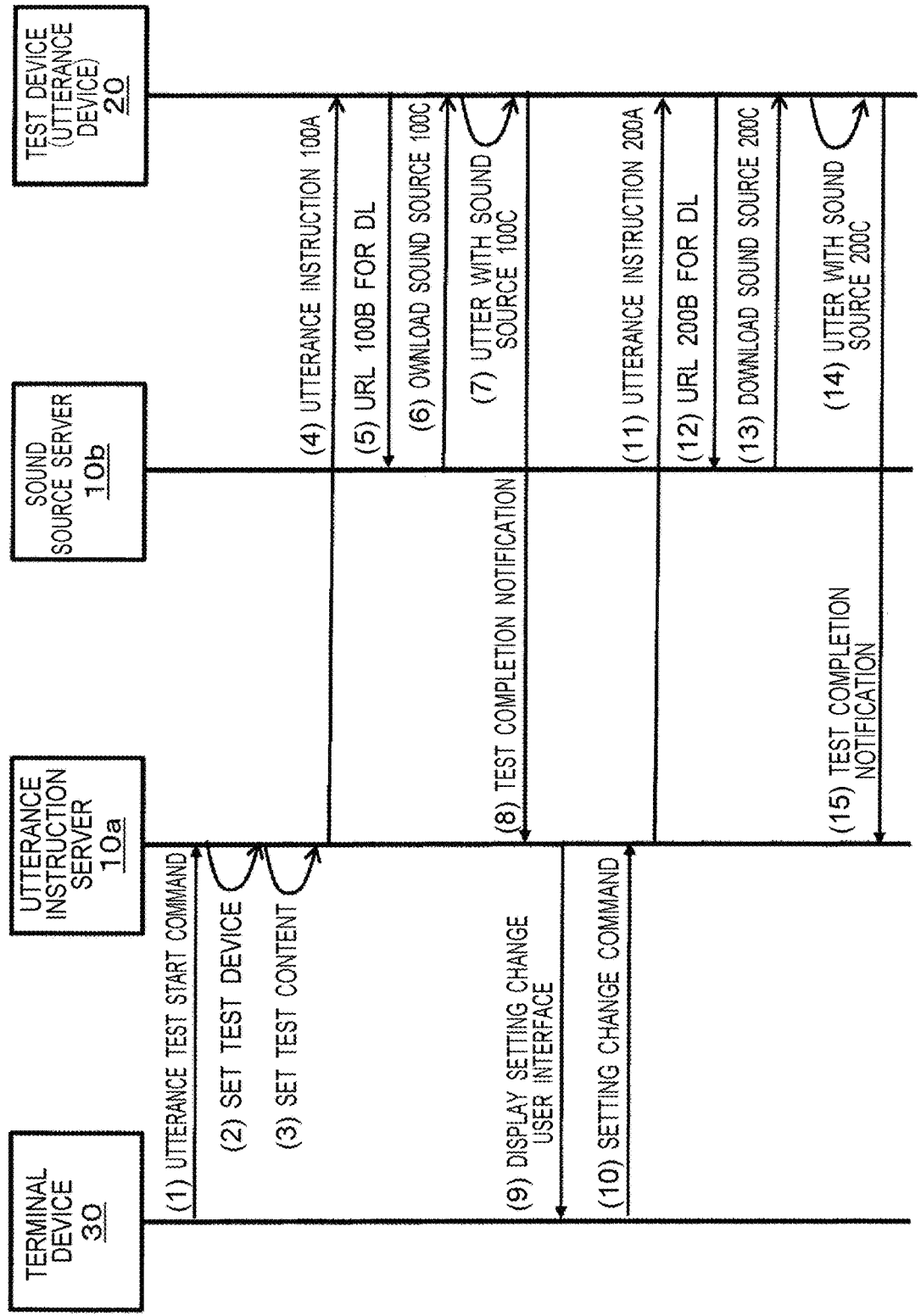
FIG. 14 is a sequence diagram of an example of the utterance test method for an utterance device in the fifth embodiment.
Figure 15:
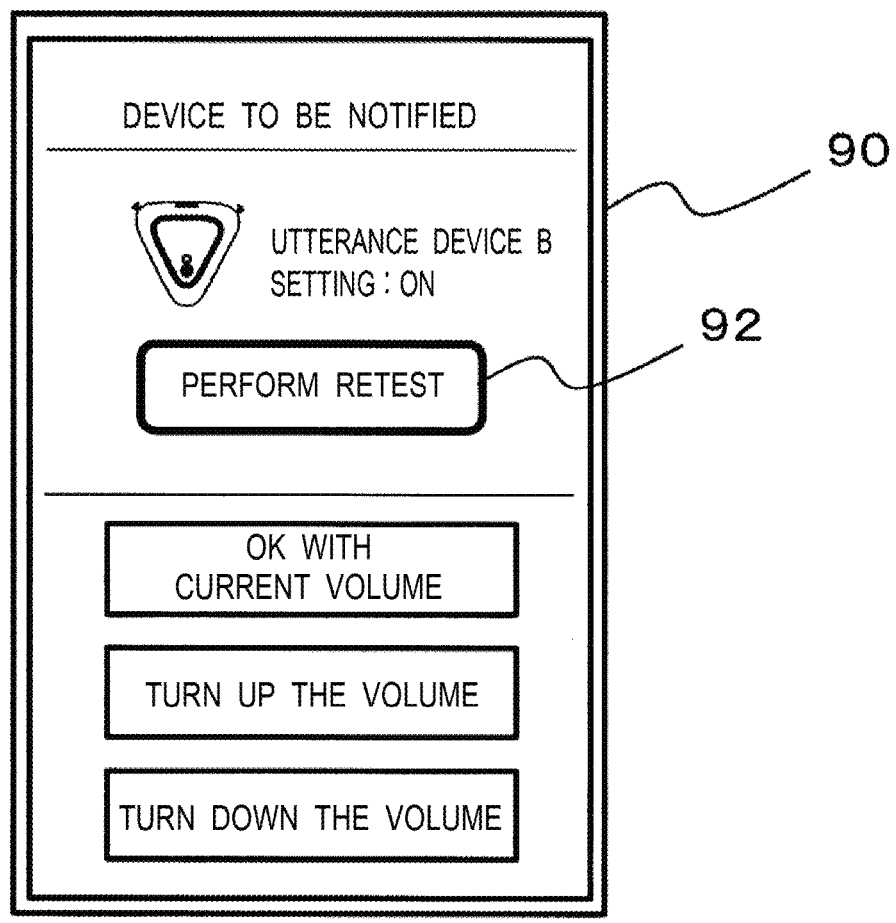
FIG. 15 is an example of a setting change user interface in the fifth embodiment.

FIG. 13 is a flowchart of an example of the utterance test method for an utterance device in the fifth embodiment, and FIG. 14 is a sequence diagram of an example of the utterance test method for an utterance device in the fifth embodiment. After causing a test device to utter test content, the server controller 14 causes the terminal, device 30 to display a setting change UI (Step S610). FIG. 15 is an example of the setting change UI in the fifth embodiment, and illustrates a screen 90 of the terminal device 30. The user can change a volume at, the time of utterance by the setting change UI.

When receiving input of change, for example, when a button of "Turn up the volume" in FIG. 15 is pressed, the terminal device 30 transmits a setting change command corresponding to the input to the utterance test server 10.

The server controller 14 determines whether the setting change command is received from the terminal device 30 (Step S620). In a case where the setting change command is received, the server controller 14 changes test content based on the setting change command, and causes the test device to utter changed test content (Step S630). For example, in a case of receiving a setting change command of "Turn up the volume", the server controller 14 transmits an utterance command in which test content is changed to a test device. In a case where there are a plurality of test devices, the user may be caused to identify at least one test device to which a change is applied via the setting change UI. Further, in the embodiment of FIG. 15, setting of a volume is changed. However, an optional item of the test content described above, for example, language and voice quality may be changed. Further, the setting change UI of a button of "OK with current volume" may be displayed so as to acquire confirmation of the user. Although the utterance setting is not changed even if such a confirmation button is pressed, the terminal device 30 may notify the utterance test server 10 that the confirmation button has been pressed.

In the UI of FIG. 15, a button 92 of "Perform retest" is provided, and when the user presses this button, the terminal device 30 transmits an utterance test start command to the utterance test server 10 so that the utterance test is performed again with changed utterance setting. In the embodiment illustrated in FIG. 14, the server controller 14 transmits an utterance command 100A to the test device 20 in Step S400 during the utterance test performed again. The test device 20 downloads a sound source 100C by using a "URL 100B for DL" designated by the utterance command 10A, utters by using the sound source 100C, and transmits a test completion notification to the utterance test server 10. When receiving the setting change command (for example, a setting change command of "turn up the volume") in Step S620, the server controller 14 sets the test content again based on the setting change command. The server controller 14 may generate a sound source whose volume is increased, or may identify a sound source corresponding to the increased volume among sound sources stored in the server storage 12. Then, the server controller 14 transmits an utterance instruction 200A including a URL ("URL 200B for DL") for downloading a sound source corresponding to the increased volume to the test device 20. The test device 20 downloads a sound source 200C whose volume is increased by using the "URL 200B for DL", and utters again by using the sound source 200C.

In one embodiment, the UI of the screen 90 is not provided with the button 92 of "Perform retest". In this case, when the user presses a button of "Turn up the volume" or the like, the terminal device 30 transmits both a corresponding setting change command and an utterance test start command to the utterance test server 10. When receiving the setting change command and the utterance test start command, the server controller 14 sets test content again based on the setting change command, and causes a test device to utter the test content set again, similarly to the embodiment in which the button 92 is provided.

Unless the utterance setting is further changed, after the utterance test ends, during normal use of the utterance device 20, the utterance test server 10 can cause the utterance device 20 to utter with the changed setting (for example, at the turned-up volume). In one embodiment, the server controller 14 changes the test content based on the setting change command, but does not perform a retest with the changed setting.

In this manner, the server controller 14 completes the processing of setting change. In this way, the user can easily change utterance setting according to his or her preference, and the user can obtain a better experience.

Sixth Embodiment

<Case where Additional Information is Uttered During Utterance Test>

In a sixth embodiment, it is possible to cause a test device to utter additional information or cause the terminal device 30 to display additional information during an utterance test, so as to provide more information regarding an utterance function of the utterance device 20 to the user.

Figure 16:
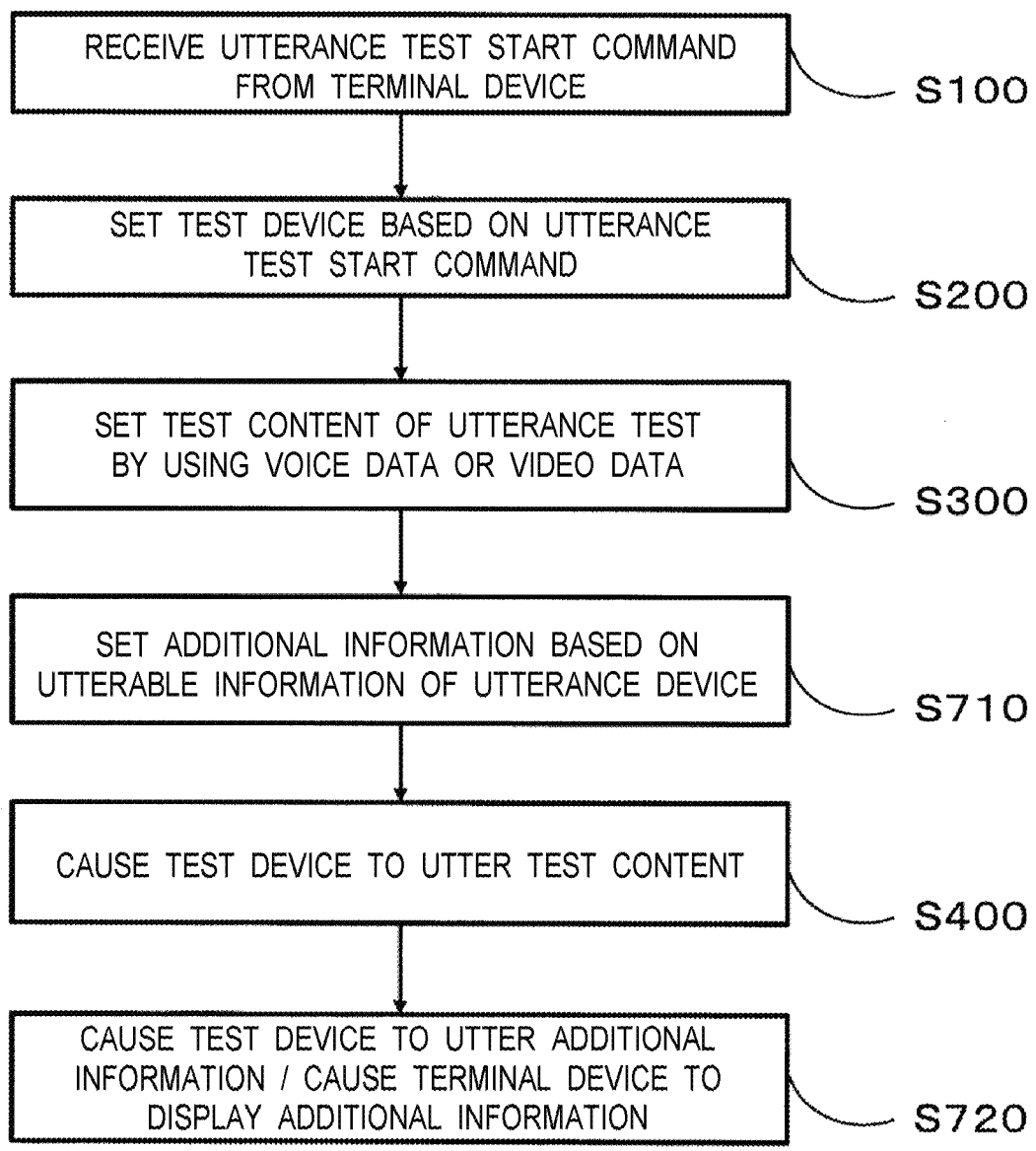
FIG. 16 is a flowchart of an example of the utterance test method for an utterance device in a sixth embodiment.
Figure 17:
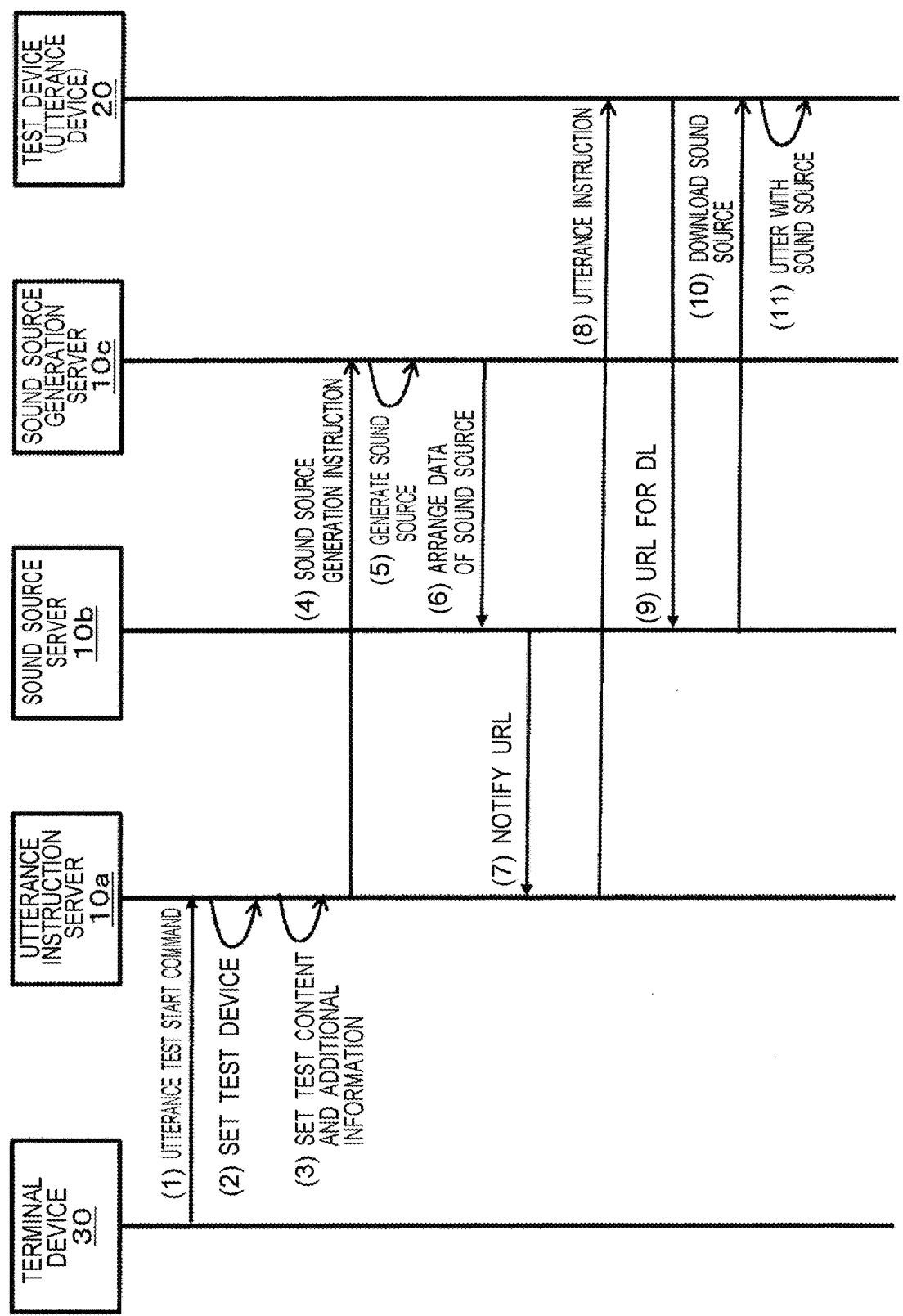
FIG. 17 is a sequence diagram of an example of the utterance test method for an utterance device in the sixth embodiment.

FIG. 16 is a flowchart of an example of the utterance test method for an utterance device in the sixth embodiment, and FIG. 17 is a sequence diagram of an example of the utterance test method for an utterance device in the sixth embodiment. In the utterance test method, the server controller 14 sets additional information based on information that the utterance device 20 can utter (Step S710). Then, the server controller 14 causes a test device to utter the additional information or causes the terminal device 30 to display the additional information (Step 3720).

The additional information is information that is capable of being uttered by the utterance device 20 (also called "utterable information" of the utterance device 20 here) and indicates information that can be provided to the user in addition to an experience of experience. For example, the additional information may be information regarding the information source device 40 or the external information source 50 that may be an information source during normal use of the utterance device 20 after the end of a test. As described above, the utterance device 20 can be caused to utter based on information unrelated to device information acquired from the information source device 40 or information unrelated to the utterance device 20 acquired from the external information source 50. In the sixth embodiment, a type or name of the information sources is notified as the additional information to support the user in understanding an utterance function. In this way, even if the number of information sources increases, the user can easily understand what is to be notified.

Specifically, for example, although a plurality of the utterance devices 20 are provided in a home, a case where only a part of the utterance devices 20 is designated by the user as a test device is considerable. In this case, the server controller 14 may use a type or name of other the utterance device 20 or a type or name of all the utterance devices 20 as the additional information, so as to present the presence of the other utterance device 20 to the user. Similarly, the server controller 14 may use, as the additional information, a type or name of the utterance device 20 or the information source device 40 set not to utter (not to notify) the device information. Further, there is a case where the server controller 14 can notify the user of information regarding a specific service (for example, weather information and information regarding a delivery status of a home delivery service) based on the external information source 50. In this case, the server controller 14 may use a type or name of the service as the additional information, so as to present the presence of this service or this information to the user.

As described above with respect to Step S300, the server controller 14 can dynamically set and generate voice data (sound source) corresponding to the additional information, or can select voice data corresponding to the additional information from voice data stored in the server storage 12. In the embodiment of FIG. 17, the utterance test server 10 includes the utterance instruction server 10a, the sound source server 10b that stores a generated sound source, and a sound source generation server 10c. After setting test content and additional information in Steps S300 and S710, the utterance instruction server 10a transmits a sound source generation instruction including the test content and the additional information to the sound source generation server 10c. The sound source generation server 10c dynamically generates data of a sound source that is suitable based on the sound source generation instruction, stores the data in the sound source server 10b, and arranges the data of the sound source. The sound source server 10b notifies the utterance instruction server 10a of a URL for downloading the sound source. In Step S400 and/or Step S720, the utterance instruction server 10a transmits an utterance instruction including the URL to a test device. The test device downloads and utters a dynamically generated sound source by using the received URL.

Note that Step S710 may be merged into Step S300. Step S720 may be merged into Step S400, and a test device may be caused to utter the additional information together with test content. In a case of a plurality of test devices, only a test device to utter first may be caused to utter the additional information.

In this manner, the server controller 14 can notify the user of the additional information regarding the information source device 40 or the external information source 50 together with an utterance test, for example. Therefore, the user can deepen the understanding of an utterance function of the utterance device 20.

Seventh Embodiment

<Case where Utterance Words are Displayed on Terminal Device>

In a seventh embodiment, utterance words (text) of test content can be displayed on the terminal device 30 before utterance. Therefore, before actually performing a test, the user can more easily understand what kind of words are uttered, and can be prepared for the utterance test.

Figure 18A:
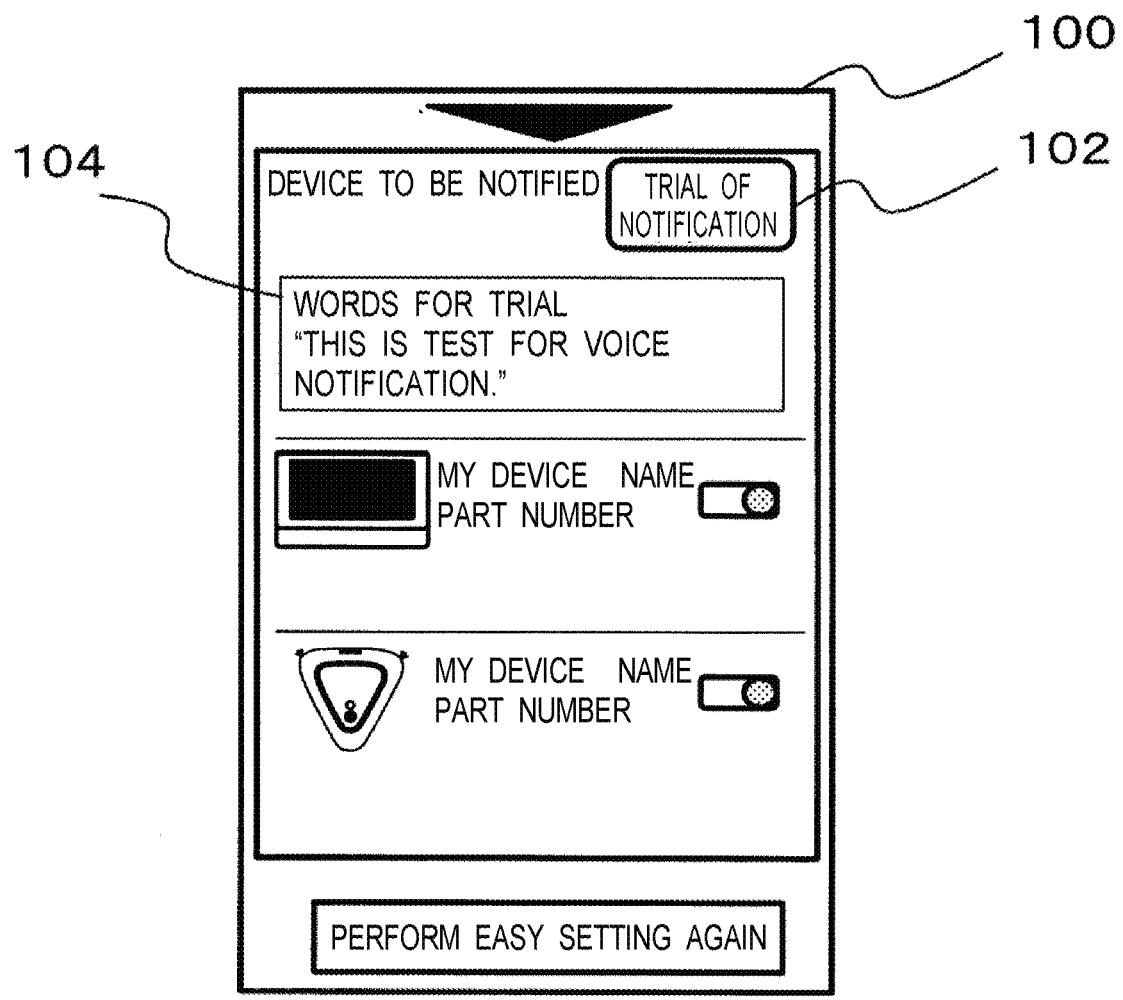
FIG. 18A is an example of display of utterance words of test content in a seventh embodiment.
Figure 18B:
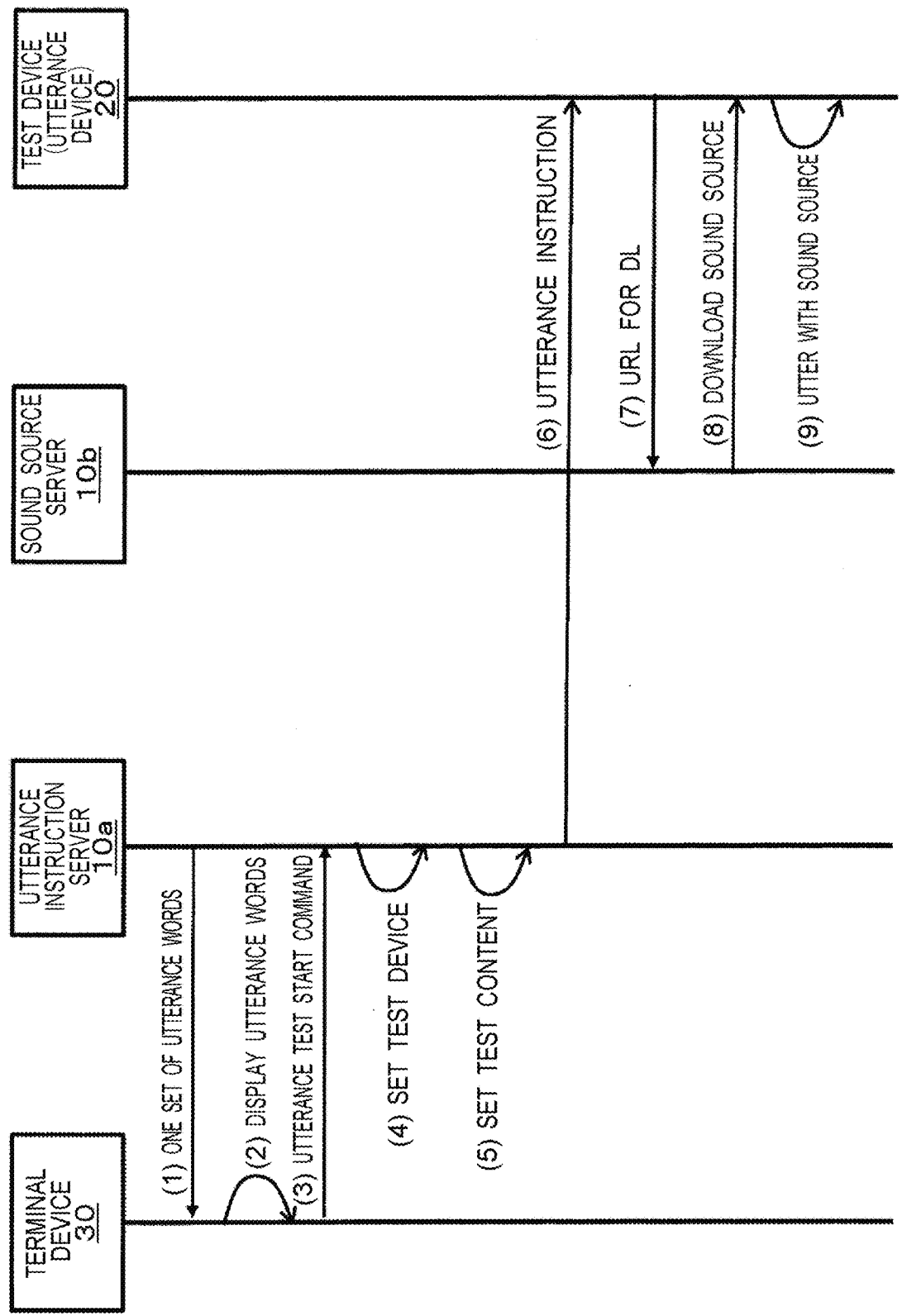
FIG. 18B is a sequence diagram of an example of the utterance test method for an utterance device in the seventh embodiment.

FIG. 18A is an example of display of utterance words of test content in the seventh embodiment, and FIG. 18B is a sequence diagram of an example of the utterance test method for an utterance device in the seventh embodiment. In the embodiment illustrated in FIGS. 18A and 18B, the server controller 14 transmits utterance words to be uttered by a test device in an utterance test to the terminal device in advance, and causes the terminal device 30 to display the utterance words.

Specifically, for example, when the related application 32 is started, or before a UI of the related application 32 makes a transition to the screen 100, the terminal device 30 inquires the utterance instruction server 10a of the utterance test server 10 about utterance words. This inquiry is performed before the terminal device 30 transmits the utterance test start command, that is, before Step S100 (FIG. 1 and the like). Next, in response to the inquiry, the utterance instruction server 10a transmits utterance words (for example, "This is a voice notification test.") to the terminal device 30 (Step (1) in FIG. 18B).

Upon receiving the utterance words, the terminal device 30 displays the words on the 01 of the related application 32 (Step (2) in FIG. 18B). As illustrated in FIG. 18A, on the screen 100 of the UI of the terminal device 30, utterance words display 104 of an utterance test is also displayed in addition to a button 102 of "Trial of notification".

When the user presses the button 102 on the screen 100, the utterance test server 10 acquires a sound source (voice data) corresponding to the utterance words and performs an utterance test as in the first to sixth embodiments. For example, when the user presses the button 102, Steps (3) to (9) in FIG. 18B are performed as described in connection with Steps (1) to (7) in FIG. 6 in the second embodiment.

In a case where utterance words are fixed and the utterance words have already been transmitted to the terminal device 30, retransmission can be omitted in a subsequent utterance test. That is, Step (1) in FIG. 18B can be omitted. In contrast, in a case where utterance words or a sound source corresponding to the utterance words can be updated, inquiry about the utterance words, transmission of the utterance words, and acquisition of a sound source for an utterance test may be performed again in a subsequent utterance test.

Figure 19A:
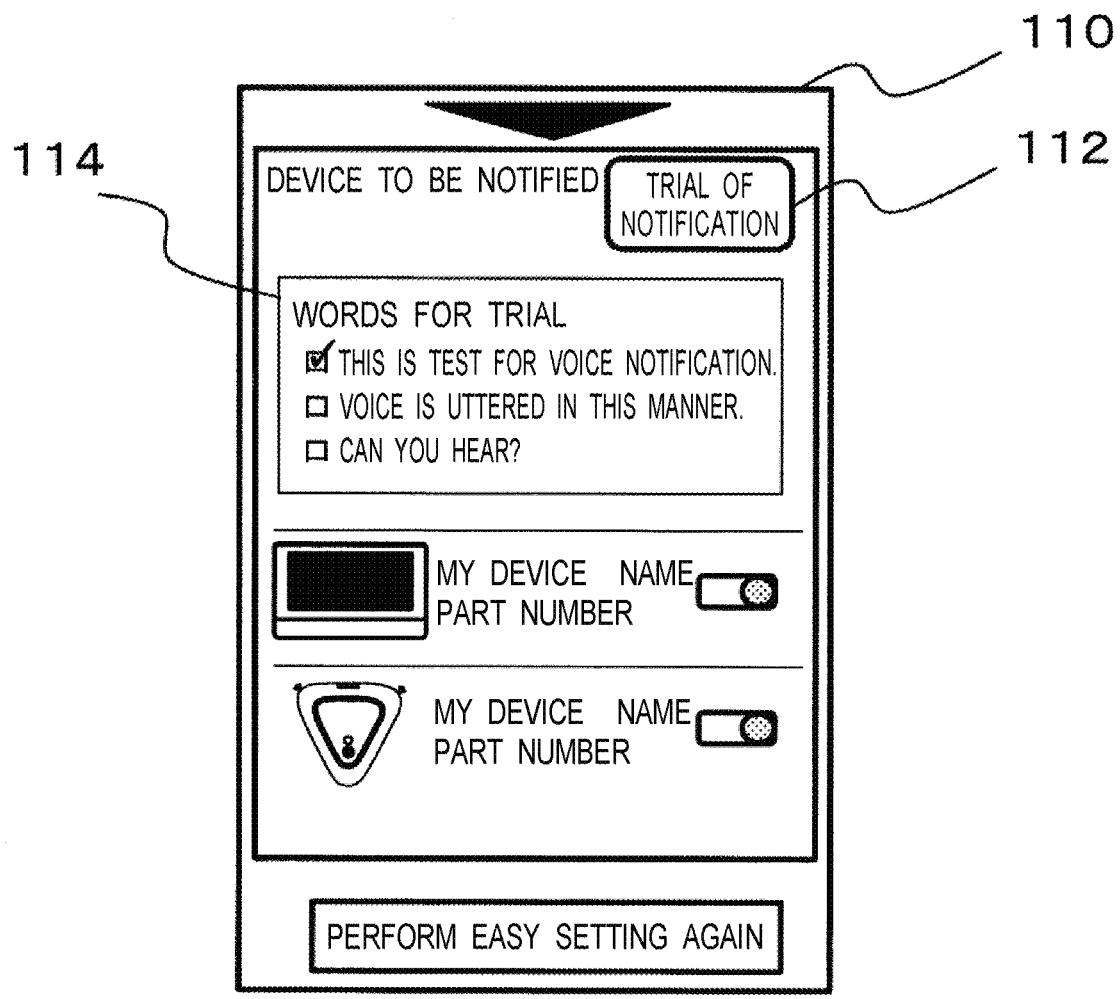
FIG. 19A is another example of display of utterance words of test content in the seventh embodiment.

FIG. 19A is another example of display of utterance words of test content in the seventh embodiment, and FIG. 19B is a sequence diagram of another example of the utterance test method for an utterance device in the seventh embodiment. In the embodiment illustrated in FIGS. 19A and 19B, the server controller 14 causes the terminal device 30 to display a plurality of candidate words, sets candidate words selected by the user as utterance words, and causes a test home appliance to utter the selected candidate words in an utterance test.

Specifically, in response to an inquiry about utterance words from the terminal device 30, the server controller 14 transmits a plurality of candidate words that can be uttered in an utterance test to the terminal device in advance (Step (1) in FIG. 19B). For example, the server controller 14 may transmit three sets of candidate words of "This is a test for a voice notification.", "Voice is uttered in this manner.", and "Can you hear?" to the terminal device 30. Timings of the inquiry about and transmission of candidate words may be the same as those in the embodiment illustrated in FIG. 18B.

When receiving the candidate words, the terminal device 30 displays display 114 of the utterance words on a screen 110 of the UI (Step (2) in FIG. 19B). The user may start an utterance test by pressing a button 112, after selecting one set of the candidate words in the display 114 of the utterance words via the UI of the terminal device 30. When the button 112 is pressed, the terminal device 30 transmits information (for example, the candidate words themselves or a corresponding identification number) by which the selected candidate words can be identified to the utterance instruction server 10a of the utterance test server 10 (Step (3) in FIG. 19B). Note that the terminal device 30 may transmit this information as part of the utterance test start command, together with the utterance test start command, or separately from the utterance test start command.

Further, one set of the candidate words (for example, a first set of the candidate words marked with a check mark in FIG. 19A) may be set by default. When the user presses the button 112 without selecting candidate words, the terminal device 30 transmits information by which default candidate words can be identified and the utterance test start command to the utterance instruction server 10a of the utterance test server 10.

When receiving the information by which the selected candidate words can be identified and receiving the utterance test start command, the utterance test server 10 acquires a sound source corresponding to the selected r candidate words and causes a test device to utter the sound source. For example, when the information by which the selected candidate words can be identified and the utterance test start command are received, Steps (4) to (9) in FIG. 19B are performed as described in connection with Steps (2) to (7) in FIG. 6 in the second embodiment based on the received information and command.

By providing a plurality of sets of candidate words and allowing the user to select the candidate words, the degree of freedom of an utterance test can be increased. Further, since selection can be made from a plurality of sets of candidate words, for example, even in a case where a plurality of utterance tests by a plurality of utterance home appliances can be executed in a selling area or the like, it is possible to prevent the user from redoing an utterance test due to mishearing. Further, since the user can select words that are easy for the user to hear, an utterance test can be executed more smoothly, and an utterance function of the utterance device 20 is more easily accepted.

Figure 20A:
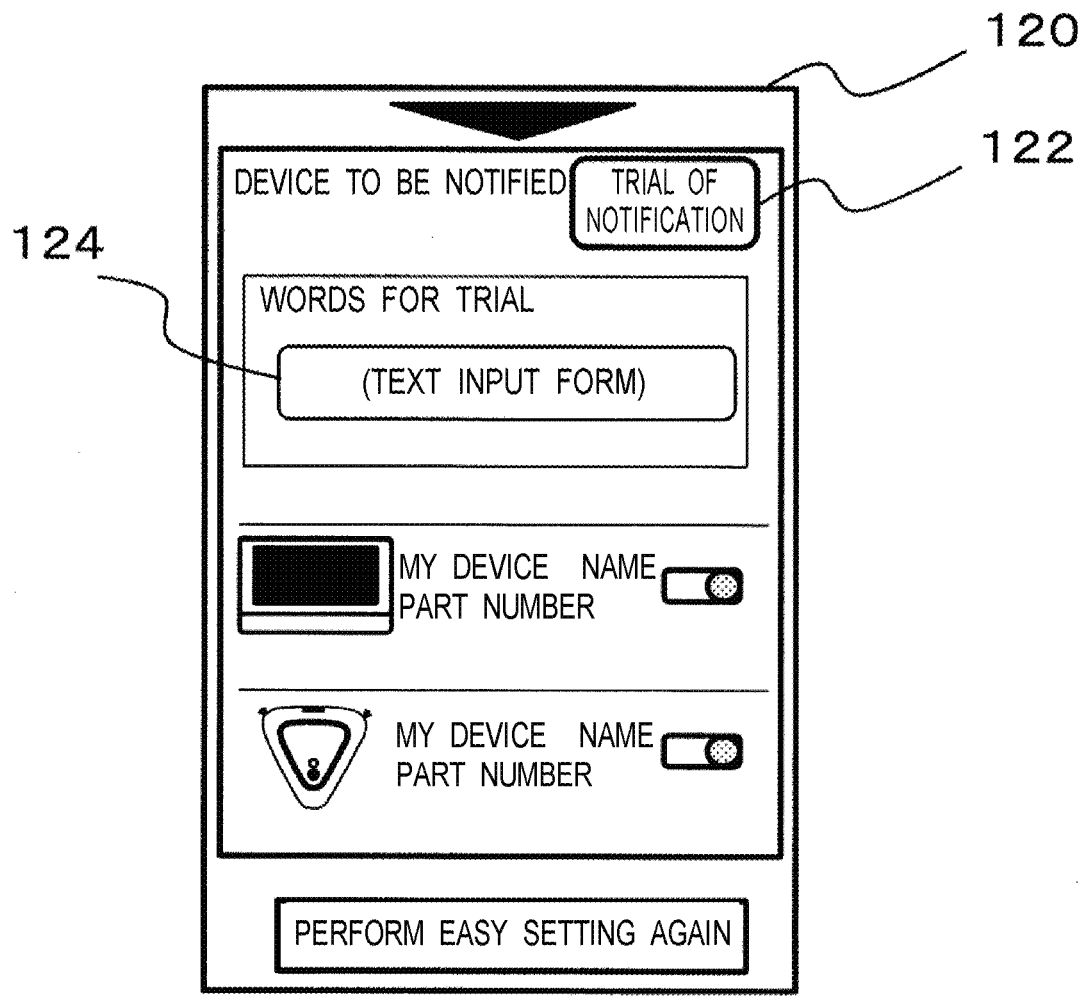
FIG. 20A is still another example of display of utterance words of test content in the seventh embodiment.
Figure 20B:
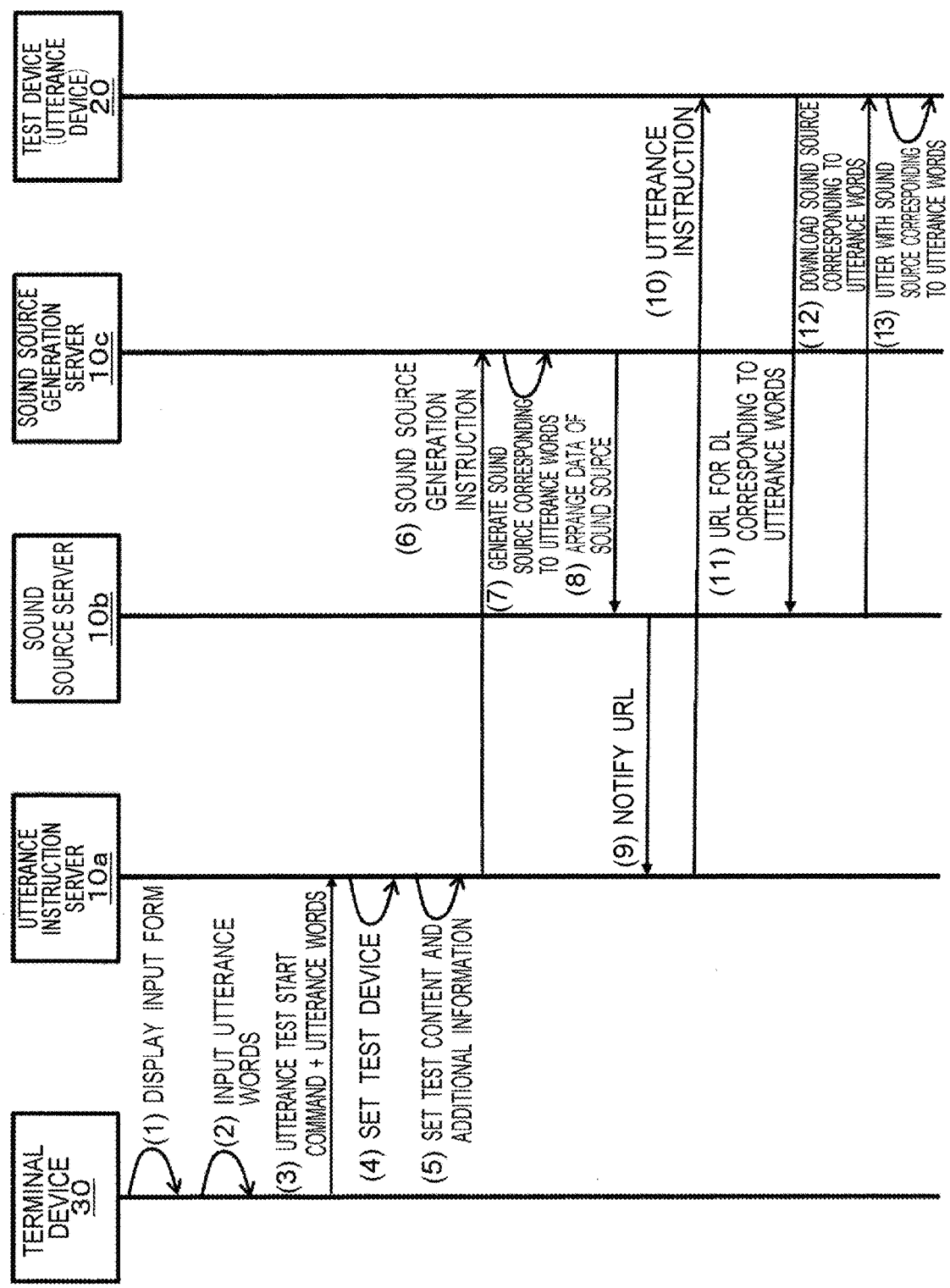
FIG. 20B is a sequence diagram of still another example of the utterance test method for an utterance device in the seventh embodiment.

FIG. 20A is still another example of display of utterance words of test content in the seventh embodiment, and FIG. 20B is a sequence diagram of still another example of the utterance test method for an utterance device in the seventh embodiment. In the embodiment illustrated in FIGS. 20A and 20B, the server controller 14 prompts the user to input words via the UI of the terminal device 30, and causes a test home appliance to utter the input words as utterance words in an utterance test. In the present embodiment, the terminal device 30 displays a text box 124 in which the user can input words on the UI, instead of receiving and displaying words of utterance words in advance from the utterance instruction server 10a of the utterance test server 10.

Specifically, the terminal device 30 displays the text box 124 for inputting utterance words on the UI (Step (1) in FIG. 20B). The user may start an utterance test by pressing a button 122 after inputting words desired to be uttered by a test device into the text box 124 via a screen 120 of the UI of the terminal device 30 (Step (2) in FIG. 20B). Words input by the user may be directly displayed in the text box 124. When the button 122 is pressed, the terminal device 30 transmits information including the input utterance words to the utterance instruction server 10a of the utterance test server 10 (Step (3) in FIG. 20B). A format of transmission of the information including utterance words and the utterance test start command may be the same as those in the embodiment illustrated in FIG. 19B.

When receiving the input utterance words, the utterance test server 10 generates a sound source corresponding to the input utterance words and causes the test device to utter the sound source as described in the above-described sixth embodiment. For example, when the information including the input candidate words and the utterance test start command are received, Steps (4) to (13) in FIG. 20B are performed as described in connection with Steps (2) to (11) in FIG. 17 in the sixth embodiment based on the received information and command.

Further, the server controller 14 may set default words and a corresponding sound source, transmit the default words to the terminal device 30 in advance, and cause the terminal device 30 to display the default words in the text box 124. In this case, when the user presses the button 122 without inputting words, the terminal device 30 transmits information by which default words can be identified and the utterance test start command to the utterance test server 10.

Note that, in a case where the utterance test server 10 or the terminal device 30 determines that the inputted words are inappropriate for an utterance test, for example, are obscene words, the utterance test server 10 or the terminal device 30 may display a message requesting input again, may automatically rewrite the inappropriate words and then perform an utterance test, or may perform an utterance test with default words.

By allowing the user to freely input words to be uttered in an utterance test, the degree of freedom in the utterance test can be further increased. Further, even in a case where a plurality of utterance tests can be executed at the same time in a selling area or the like, it is easier to hear and distinguish them from each other and the utterance tests can be executed more smoothly.

<Program Used in Terminal Communicating with Utterance Test Server 10>

A terminal that communicates with the utterance test server 10, for example, the utterance device 20 or the terminal device 30 has a program used to execute the utterance test as described above.

In a case where a program for executing an utterance test is used for the utterance device 20, the program is stored in the device storage 21. The device controller 22 realizes a function of an utterance test by executing the program. For example, the device controller 22 executes the program to receive an utterance instruction from the utterance test server 10, downloads a test sound source by using a URL included in utterance designation, and utters with the downloaded sound source.

In a case where a program for executing an utterance test is used for the terminal device 30, the program is stored in a storage of the terminal device 30. The terminal device 30 realizes a function of an utterance test by executing the program. For example, the terminal device 30 presents a UI for receiving an input for starting an utterance test and a UI such as the setting change UI to the user by executing the program, and transmits an utterance test start command or a setting change command to the utterance test server 10 based on input of the user. Further, the terminal device 30 can display a test failure notification corresponding to a failure cause and/or additional information by executing the program.

As described above, a program for functioning as the utterance test server 10, the utterance device 20, or the terminal device 30 may be stored in a computer-readable storage medium that can be read by a computer. When a computer-readable storage medium storing the program is supplied to the utterance test server 10, the utterance device 20, or the terminal device 30, a controller of these (for example, CPU, MPU, or the like) can exert its function by reading and executing the program stored in the computer-readable storage medium. As the computer-readable storage medium, a ROM, a floppy (registered trademark) disk, a hard disk, an optical disk, a magneto-optical disk, a CD-ROM, a CD-R, a magnetic tape, a non-volatile memory card, or the like can be used.

The above are merely specific embodiments of the present disclosure, and the protection scope of the present disclosure is not limited to them. The present disclosure includes content described above in the drawings and the specific embodiments described above. However, the present disclosure is not limited the content. Various disclosed embodiments or examples can be combined without departing from the scope or spirit of the present disclosure. Changes which do not depart from the functional and structural principles of the present disclosure are within the scope of the claims.

DESCRIPTION OF SYMBOLS 10 utterance test server
10a utterance instruction server 10*b* sound source server
12, 12*a*, 12*b* server storage
14, 14*a*, 14*b* server controller
16 server communicator
20 utterance device (test device)
21 device storage
22 device controller
23 device communicator
24 speaker
25 display
26 sensor
30 terminal device
32 related application
40 information source device
50 external information source
60, 70, 80, 90, 100, 110, 120 screen
62, 72, 92, 1.02, 112, 122 button
104, 114 display of utterance words
124 text box

The invention claimed is:

1. An utterance test method comprising:
receiving an utterance test start command from a terminal device;
setting, based on the utterance test start command, at least one utterance device to be a test device as a target of an utterance test;
setting test content of the utterance test by using voice data or video data according to the set test device;
transmitting an utterance instruction for causing the test device to utter the test content;
determining, in a case where a test end notification is not received from the test device within a predetermined time after transmitting the utterance instruction to the test device, that the utterance test has failed; and
transmitting a test failure notification corresponding to a cause of a failure to the terminal device and causing the terminal device to display the test failure notification.

2. The utterance test method according to claim 1, wherein the utterance test start command includes input information designating one or more utterance devices as the test device, and
wherein when setting the test device, the test device is set, based on the utterance test start command, such that the one or more utterance devices designated in the input information, all the utterance devices, or an utterance device closest to a user of the terminal device is set to be the test device.

3. The utterance test method for an utterance device- according to claim 1, wherein the test content includes at least one of utterance words of the voice data, utterance words of the video data, a volume of an utterance, a frequency component of an utterance, and a speed of an utterance.

4. The utterance test method according to claim 1, wherein in the utterance test start command, a plurality of test devices are set, and order information for performing the utterance test on the plurality of test devices is included;
wherein when causing the test device to utter the test content, each of the plurality of test devices is caused to utter the test content in order designated in the order information of the utterance test start command.

5. The utterance test method according to claim 4, wherein when causing the test device to utter the test content, each of the plurality of test devices is caused to utter the test content in a manner that, after a test completion notification is received from one test device that is caused to utter, a next one of the test devices in the order information is caused to utter.

6. The utterance test method according to claim 1, further comprising:
causing the terminal device to display a setting change user interface; and
changing, in a case of receiving a setting change command from the terminal device, the test content based on the setting change command, and causing the test device to utter the changed test content.

7. The utterance test method according to claim 1, further comprising:
setting additional information based on utterable information; and
causing the test device to utter the additional information together with the test content, or causing the terminal device to display the additional information.

8. The utterance test method according to claim 1, further comprising:
causing the terminal device to display utterance words of the test content, before receiving the utterance test start command from the terminal device.

9. An utterance test server comprising:
a server storage that stores voice data or video data; and
a server controller; wherein
the server controller is configured to:
receive an utterance test start command from a terminal device;
set, based on the utterance test start command, at least one utterance device to be a test device as a target of an utterance test;
set test content of the utterance test by using the voice data or the video data according to the set test device;
transmit an utterance instruction for causing the test device to utter the test content;
determine, in a case where a test end notification is not received from the test device within a predetermined time after transmitting the utterance instruction to the test device, that the utterance test has failed; and
transmit a test failure notification corresponding to a cause of a failure to the terminal device and cause the terminal device to display the test failure notification.

10. The utterance test server according to claim 9, wherein the utterance test start command includes input information designating one or more utterance devices as the test device;
wherein the server controller is further configured to set, based on the utterance test start command, the one or more utterance devices designated in the input information, all the utterance devices, or an utterance device closest to a user of the terminal device to be the test device.

11. The utterance test server according to claim 9, wherein the test content includes at least one of utterance words of the voice data, utterance words of the video data, a volume of an utterance, a frequency component of an utterance, and a speed of an utterance.

12. The utterance test server according to claim 9, wherein in the utterance test start command, a plurality of test devices are set, and order information for performing the utterance test on the plurality of test devices is included;
wherein the server controller is further configured to cause each of the plurality of test devices to utter the test content in order designated in the order information of the utterance test start command when the test device is caused to utter the test content.

13. The utterance test server according to claim 12, wherein when causing the test device to utter the test content, the server controller is further configured to cause each of the plurality of test devices to utter the test content in a manner that, after a test completion notification is received from one test device that is caused to utter, a next one of the test devices in the order information is caused to utter.

14. The utterance test server according to claim 9, wherein the server controller is further configured to:
cause the terminal device to display a setting change user interface; and
change, when receiving a setting change command from the terminal device, the test content based on the setting change command, and cause the test device to utter the changed test content.

15. The utterance test server according to claim 9, wherein the server controller is further configured to:
set additional information based on utterable information; and
cause the test device to utter the additional information together with the test content, or cause the terminal device to display the additional information.

16. The utterance test server according to claim 9, wherein the server controller is further configured to:
cause the terminal device to display utterance words of the test content, before receiving the utterance test start command from the terminal device.

17. An utterance test system comprising:
at least one utterance device capable of uttering;
a terminal device capable of transmitting an utterance test start command in association with the at least one utterance device; and
the utterance test server according to claim 9.

* * * * *